(12) United States Patent
Radi et al.

(10) Patent No.: US 11,765,250 B2
(45) Date of Patent: Sep. 19, 2023

(54) DEVICES AND METHODS FOR MANAGING NETWORK TRAFFIC FOR A DISTRIBUTED CACHE

(71) Applicant: Western Digital Technologies, Inc., San Jose, CA (US)

(72) Inventors: Marjan Radi, San Jose, CA (US); Dejan Vucinic, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/914,206

(22) Filed: Jun. 26, 2020

(65) Prior Publication Data

US 2021/0409506 A1    Dec. 30, 2021

(51) Int. Cl.
*H04L 67/568* (2022.01)
*H04L 67/1097* (2022.01)
(Continued)

(52) U.S. Cl.
CPC ............ *H04L 67/568* (2022.05); *G06F 9/546* (2013.01); *G06F 12/0824* (2013.01);
(Continued)

(58) Field of Classification Search
CPC ............... H04L 67/2842; H04L 43/062; H04L 43/0852; H04L 43/16; H04L 45/38;
(Continued)

(56) References Cited

U.S. PATENT DOCUMENTS 6,044,438 A    3/2000 Olnowich
6,078,997 A    6/2000 Young et al.
(Continued)

FOREIGN PATENT DOCUMENTS

KR    102163279    10/2020

OTHER PUBLICATIONS

International Search Report and Written Opinion dated Oct. 28, 2021 from International Application No. PCT/US2021/039070, 7 pages.
(Continued)

*Primary Examiner* — Anh Nguyen
(74) *Attorney, Agent, or Firm* — Barry IP Law, P.C.

(57) ABSTRACT

A programmable switch includes ports, and circuitry to receive cache messages for a distributed cache from client devices. The cache messages are queued for sending to memory devices from the ports. Queue occupancy information is generated and sent to a controller that determines, based at least in part on the queue occupancy information, at least one of a cache message transmission rate for a client device, and one or more weights for the queues used by the programmable switch. In another aspect, the programmable switch extracts cache request information from a cache message. The cache request information indicates a cache usage and is sent to the controller, which determines, based at least in part on the extracted cache request information, at least one of a cache message transmission rate for a client device, and one or more weights for queues used in determining an order for sending cache messages.

18 Claims, 11 Drawing Sheets

(51) Int. Cl.
  *H04L 43/0852* (2022.01)
  *H04L 43/062* (2022.01)
  *H04L 45/00* (2022.01)
  *G06F 12/0817* (2016.01)
  *G06F 9/54* (2006.01)
  *H04L 43/16* (2022.01)

(52) U.S. Cl.
  CPC ........ *H04L 43/062* (2013.01); *H04L 43/0852* (2013.01); *H04L 43/16* (2013.01); *H04L 45/38* (2013.01); *H04L 67/1097* (2013.01); *G06F 2212/154* (2013.01)

(58) Field of Classification Search
  CPC . H04L 67/1097; G06F 9/546; G06F 12/0824; G06F 2212/154
  See application file for complete search history.

(56) References Cited

U.S. PATENT DOCUMENTS

| | | | |
|---|---|---|---|
| 6,108,737 | A | 8/2000 | Sharma et al. |
| 6,209,065 | B1 | 3/2001 | Van Doren et al. |
| 6,230,243 | B1 | 5/2001 | Elko et al. |
| 6,263,404 | B1 | 7/2001 | Borkenhagen et al. |
| 6,298,418 | B1 | 10/2001 | Fujiwara et al. |
| 6,343,346 | B1 | 1/2002 | Olnowich |
| 6,775,804 | B1 | 8/2004 | Dawson |
| 6,829,683 | B1 | 12/2004 | Kuskin |
| 6,868,439 | B2 | 3/2005 | Basu et al. |
| 6,954,844 | B2 | 10/2005 | Lentz et al. |
| 6,993,630 | B1 | 1/2006 | Williams et al. |
| 7,032,078 | B2 | 4/2006 | Cypher et al. |
| 7,376,799 | B2 | 5/2008 | Veazey et al. |
| 7,673,090 | B2 | 3/2010 | Kaushik et al. |
| 7,716,425 | B1 | 5/2010 | Uysal et al. |
| 7,975,025 | B1 | 7/2011 | Szabo et al. |
| 8,166,251 | B2 | 4/2012 | Luttrell |
| 8,281,075 | B2 | 10/2012 | Arimilli et al. |
| 9,088,592 | B1 | 7/2015 | Craft et al. |
| 9,313,604 | B1* | 4/2016 | Holcombe .............. H04L 43/16 |
| 9,442,850 | B1 | 9/2016 | Rangarajan et al. |
| 9,467,380 | B2 | 10/2016 | Hong et al. |
| 9,712,381 | B1 | 7/2017 | Emanuel et al. |
| 9,819,739 | B2 | 11/2017 | Hussain et al. |
| 9,825,862 | B2 | 11/2017 | Bosshart |
| 9,826,071 | B2 | 11/2017 | Bosshart |
| 9,880,768 | B2 | 1/2018 | Bosshart |
| 9,910,615 | B2 | 3/2018 | Bosshart |
| 9,912,610 | B2 | 3/2018 | Bosshart et al. |
| 9,923,816 | B2 | 3/2018 | Kim et al. |
| 9,936,024 | B2 | 4/2018 | Malwankar et al. |
| 9,940,056 | B2 | 4/2018 | Bosshart |
| 10,038,624 | B1 | 7/2018 | Cruz et al. |
| 10,044,583 | B2 | 8/2018 | Kim et al. |
| 10,050,854 | B1 | 8/2018 | Licking et al. |
| 10,063,407 | B1 | 8/2018 | Kodeboyina et al. |
| 10,063,479 | B2 | 8/2018 | Kim et al. |
| 10,063,638 | B2 | 8/2018 | Huang |
| 10,067,967 | B1 | 9/2018 | Bosshart |
| 10,075,567 | B1 | 9/2018 | Licking et al. |
| 10,078,463 | B1 | 9/2018 | Bosshart |
| 10,084,687 | B1 | 9/2018 | Sharif et al. |
| 10,110,454 | B2 | 10/2018 | Kim et al. |
| 10,127,983 | B1 | 11/2018 | Peterson et al. |
| 10,133,499 | B2 | 11/2018 | Bosshart |
| 10,146,527 | B2 | 12/2018 | Olarig et al. |
| 10,158,573 | B1 | 12/2018 | Lee et al. |
| 10,164,829 | B1 | 12/2018 | Watson et al. |
| 10,169,108 | B2 | 1/2019 | Gou et al. |
| 10,225,381 | B1 | 3/2019 | Bosshart |
| 10,230,810 | B1 | 3/2019 | Bhide et al. |
| 10,237,206 | B1 | 3/2019 | Agrawal et al. |
| 10,257,122 | B1 | 4/2019 | Li et al. |
| 10,268,634 | B1 | 4/2019 | Bosshart et al. |
| 10,298,456 | B1* | 5/2019 | Chang .................. G06F 1/32 |
| 10,496,566 | B2 | 12/2019 | Olarig et al. |
| 10,628,353 | B2 | 4/2020 | Prabhakar et al. |
| 10,635,316 | B2 | 4/2020 | Singh et al. |
| 10,761,995 | B2 | 9/2020 | Blaner et al. |
| 10,812,388 | B2 | 10/2020 | Thubert et al. |
| 10,880,204 | B1 | 12/2020 | Shalev et al. |
| 2003/0009637 | A1 | 1/2003 | Arimilli et al. |
| 2003/0028819 | A1 | 2/2003 | Chiu et al. |
| 2003/0158999 | A1 | 8/2003 | Hauck et al. |
| 2004/0044850 | A1 | 3/2004 | George et al. |
| 2004/0073699 | A1 | 4/2004 | Hong et al. |
| 2004/0260883 | A1 | 12/2004 | Wallin et al. |
| 2005/0058149 | A1 | 3/2005 | Howe |
| 2006/0265568 | A1 | 11/2006 | Burton |
| 2007/0067382 | A1 | 3/2007 | Sun |
| 2008/0010409 | A1 | 1/2008 | Rao et al. |
| 2009/0240664 | A1 | 9/2009 | Dinker et al. |
| 2009/0240869 | A1 | 9/2009 | O'Krafka et al. |
| 2009/0313503 | A1 | 12/2009 | Atluri et al. |
| 2010/0008260 | A1 | 1/2010 | Kim et al. |
| 2010/0223322 | A1 | 9/2010 | Mott et al. |
| 2011/0004729 | A1 | 1/2011 | Akkawi et al. |
| 2011/0093925 | A1 | 4/2011 | Krishnamoorthy et al. |
| 2011/0238923 | A1 | 9/2011 | Hooker et al. |
| 2012/0110108 | A1 | 5/2012 | Li et al. |
| 2012/0155264 | A1* | 6/2012 | Sharma .............. H04L 47/6215 370/232 |
| 2013/0254325 | A1 | 9/2013 | Song et al. |
| 2013/0263249 | A1 | 10/2013 | Song et al. |
| 2014/0219284 | A1 | 8/2014 | Chau et al. |
| 2014/0241361 | A1 | 8/2014 | Bosshart et al. |
| 2014/0269413 | A1 | 9/2014 | Hui et al. |
| 2014/0269716 | A1 | 9/2014 | Pruss et al. |
| 2014/0278575 | A1 | 9/2014 | Anton et al. |
| 2014/0331001 | A1 | 11/2014 | Liu et al. |
| 2014/0362709 | A1 | 12/2014 | Kashyap et al. |
| 2015/0195216 | A1 | 7/2015 | Di Pietro et al. |
| 2015/0301949 | A1 | 10/2015 | Koka et al. |
| 2015/0319243 | A1 | 11/2015 | Hussain et al. |
| 2015/0378919 | A1 | 12/2015 | Anantaraman et al. |
| 2016/0050150 | A1 | 2/2016 | Venkatesan et al. |
| 2016/0099872 | A1 | 4/2016 | Kim et al. |
| 2016/0127492 | A1 | 5/2016 | Malwankar et al. |
| 2016/0156558 | A1 | 6/2016 | Hong et al. |
| 2016/0216913 | A1 | 7/2016 | Bosshart |
| 2016/0246507 | A1 | 8/2016 | Bosshart |
| 2016/0246535 | A1 | 8/2016 | Bosshart |
| 2016/0294451 | A1* | 10/2016 | Jung .................... H04B 17/20 |
| 2016/0315964 | A1 | 10/2016 | Shetty et al. |
| 2016/0323189 | A1* | 11/2016 | Ahn .................... H04L 47/24 |
| 2017/0026292 | A1 | 1/2017 | Smith et al. |
| 2017/0054618 | A1 | 2/2017 | Kim |
| 2017/0054619 | A1 | 2/2017 | Kim |
| 2017/0063690 | A1 | 3/2017 | Bosshart |
| 2017/0064047 | A1 | 3/2017 | Bosshart |
| 2017/0093707 | A1 | 3/2017 | Kim et al. |
| 2017/0093986 | A1 | 3/2017 | Kim et al. |
| 2017/0093987 | A1 | 3/2017 | Kaushalram et al. |
| 2017/0187846 | A1* | 6/2017 | Shalev ............. G06F 15/17331 |
| 2017/0214599 | A1 | 7/2017 | Seo et al. |
| 2017/0286363 | A1 | 10/2017 | Joshua et al. |
| 2017/0371790 | A1 | 12/2017 | Dwiel et al. |
| 2018/0034740 | A1 | 2/2018 | Beliveau et al. |
| 2018/0060136 | A1 | 3/2018 | Herdrich et al. |
| 2018/0173448 | A1 | 6/2018 | Bosshart |
| 2018/0176324 | A1 | 6/2018 | Kumar et al. |
| 2018/0234340 | A1 | 8/2018 | Kim et al. |
| 2018/0234355 | A1 | 8/2018 | Kim et al. |
| 2018/0239551 | A1 | 8/2018 | Bosshart |
| 2018/0242191 | A1* | 8/2018 | Lundqvist ............ H04W 40/12 |
| 2018/0260330 | A1 | 9/2018 | Felter et al. |
| 2018/0262459 | A1 | 9/2018 | Wang et al. |
| 2018/0285275 | A1 | 10/2018 | Barczak et al. |
| 2018/0329818 | A1 | 11/2018 | Cheng et al. |
| 2018/0335953 | A1 | 11/2018 | Ramaswamy et al. |
| 2018/0337860 | A1 | 11/2018 | Kim et al. |
| 2018/0349163 | A1 | 12/2018 | Gao et al. |
| 2018/0349285 | A1 | 12/2018 | Ish et al. |

(56) References Cited

U.S. PATENT DOCUMENTS

| | | | |
|---|---|---|---|
| 2019/0012278 | A1 | 1/2019 | Sindhu et al. |
| 2019/0044878 | A1 | 2/2019 | Steffen et al. |
| 2019/0050333 | A1 | 2/2019 | Chacon et al. |
| 2019/0058646 | A1 | 2/2019 | Kim et al. |
| 2019/0087341 | A1 | 3/2019 | Pugsley et al. |
| 2019/0196987 | A1 | 6/2019 | Shen et al. |
| 2019/0220429 | A1 | 7/2019 | Ranjan et al. |
| 2019/0227921 | A1 | 7/2019 | Frolikov |
| 2019/0342785 | A1 | 11/2019 | Li et al. |
| 2019/0354402 | A1 | 11/2019 | Bivens et al. |
| 2019/0370176 | A1 | 12/2019 | Priyadarshi et al. |
| 2019/0391928 | A1 | 12/2019 | Lin |
| 2019/0394261 | A1 | 12/2019 | DeCusatis et al. |
| 2020/0007408 | A1 | 1/2020 | Siddappa |
| 2020/0065269 | A1 | 2/2020 | Balasubramani et al. |
| 2020/0068014 | A1* | 2/2020 | Sarkar .................. H04L 12/462 |
| 2020/0089619 | A1 | 3/2020 | Hsu et al. |
| 2020/0097212 | A1 | 3/2020 | Lakshman et al. |
| 2020/0151104 | A1 | 5/2020 | Yang |
| 2020/0213156 | A1 | 7/2020 | Cheng et al. |
| 2020/0226068 | A1 | 7/2020 | Gellerich et al. |
| 2020/0250099 | A1 | 8/2020 | Campbell et al. |
| 2020/0293499 | A1 | 9/2020 | Kohli et al. |
| 2020/0313999 | A1 | 10/2020 | Lee et al. |
| 2020/0349080 | A1 | 11/2020 | Radi et al. |
| 2020/0379668 | A1 | 12/2020 | Akaike et al. |
| 2021/0034250 | A1 | 2/2021 | Mizuno et al. |
| 2021/0034270 | A1 | 2/2021 | Gupta et al. |
| 2021/0049078 | A1 | 2/2021 | Khan et al. |
| 2021/0051751 | A1 | 2/2021 | Pawar |
| 2021/0073086 | A1 | 3/2021 | Subraya et al. |
| 2021/0149807 | A1 | 5/2021 | Gupta et al. |
| 2021/0173589 | A1 | 6/2021 | Benisty et al. |
| 2021/0194828 | A1 | 6/2021 | He et al. |
| 2021/0218623 | A1 | 7/2021 | Jain et al. |
| 2021/0247935 | A1 | 8/2021 | Beygi et al. |
| 2021/0266219 | A1 | 8/2021 | Kim et al. |
| 2021/0294506 | A1 | 9/2021 | Tadokoro |
| 2021/0318828 | A1 | 10/2021 | Valtonen |

OTHER PUBLICATIONS

Liu et al.; "DistCache: provable load balancing for large-scale storage systems with distributed caching"; FAST '19: Proceedings of the 17th USENIX Conference on File and Storage Technologies; Feb. 2019; pp. 143-157 (Year 2019).

Radi et al.; "OmniXtend: direct to caches over commodity fabric"; 2019 IEEE Symposium on High-Performance Interconnects (HOTI); Santa Clara, CA; Aug. 2019; pp. 59-62 (Year 2019).

Wang et al.; "Concordia: Distributed Shared Memory with In-Network Cache Coherence"; 19th USENIX Conference on File and Storage Technologies; pp. 277-292; Feb. 2021.

Ibrar et al.; "PrePass-Flow: A Machine Learning based Technique to Minimize ACL Policy Violation Due to Links Failure in Hybrid SDN"; Nov. 20, 2020; Computer Networks; available at https://doi.org/10.1016/j.comnet.2020.107706.

Saif et al.; "IOscope: A Flexible I/O Tracer for Workloads' I/O Pattern Characterization"; Jan. 25, 2019; International Conference on High Performance Computing; available at https://doi.org/10.1007/978-3-030-02465-9_7.

Zhang et al.; "PreFix Switch Failure Prediction in Datacenter Networks"; Mar. 2018; Proceedings of the ACM on the Measurement and Analysis of Computing Systems; available at: https://doi.org/10.1145/3179405.

Pending U.S. Appl. No. 17/353,781, filed Jun. 21, 2021, entitled "In-Network Failure Indication and Recovery", Marjan Radi et al.

Pending U.S. Appl. No. 17/331,453, filed May 26, 2021, entitled "Distributed Cache Management", Marjan Radi et al.

Stefanovici et al.; "Software-Defined Caching: Managing Caches in Multi-Tenant Data Centers"; Aug. 2015; pp. 174-181; SoCC '15: Proceedings of the Sixth ACM Symposium on Cloud Computing; available at: http://dx.doi.org/10.1145/2806777.2806933.

Mahmood et al.; "Efficient Caching through Stateful SDN in Named Data Networking"; Dec. 14, 2017; Transactions on Emerging Telecommunications Technologies; vol. 29, issue 1; available at: https://onlinelibrary.wiley.com/doi/abs/10.1002/ett.3271.

Liu et al.; "DistCache: Provable Load Balancing for Large-Scale Storage Systems with Distributed Caching"; Feb. 2019; Proceedings of the 17th USENIX Conference on File and Storage Technologies; available at: https://www.usenix.org/conference/fast19/presentation/liu.

Hashemi et al.; "Learning Memory Access Patters"; 15 pages; Mar. 6, 2018; available at https://arxiv.org/pdf/1803.02329.pdf.

Kim, et al.; "A Framework for Data Prefetching using Off-line Training of Markovian Predictors"; Sep. 18, 2002; 8 pages; available at https://www.comp.nus.edu.sg/~wongwf/papers/ICCD2002.pdf.

Eisley et al.; "In-Network Cache Coherence"; 2006; pp. 321-332; Proceedings of the 39th Annual IEEE/ACM International Symposium on Microarchitecture.

Jin et al.; "NetCache: Balancing Key-Value Stores with Fast In-Network Caching"; Oct. 28, 2017; pp. 121-136; Proceedings of the 26th Symposium on Operating Systems Principles.

Li et al.; "Pegasus: Load-Aware Selective Replication with an In-Network Coherence Directory"; Dec. 2018; 15 pages; Technical Report UW-CSE-18-12-01, University of Washington CSE, Seattle, WA.

Liu et al.; "IncBricks: Toward In-Network Computation with an In-Network Cache"; Apr. 2017; pp. 795-809; ACM SIGOPS Operating Systems Review 51, Jul. 26, No. 2.

Pending U.S. Appl. No. 16/697,019, filed Nov. 26, 2019, entitled "Fault Tolerant Data Coherence in Large-Scale Distributed Cache Systems", Marjan Radi et al.

Vestin et al.; "FastReact: In-Network Control and Caching for Industrial Control Networks using Programmable Data Planes"; Aug. 21, 2018; pp. 219-226; IEEE 23rd International Conference on Emerging Technologies and Factory Automation (ETFA). vol. 1.

Pending U.S. Appl. No. 16/548,116, filed Aug. 22, 2019, entitled "Distributed Cache With In-Network Prefetch", Marjan Radi et al.

Written Opinion dated Feb. 20, 2020 from International Application No. PCT/US2019/068360, 4 pages.

Botelho et al.; "On the Design of Practical Fault-Tolerant SDN Controllers"; Sep. 2014; 6 pages; available at: http://www.di.fc.ul.pt/~bessani/publications/ewsdn14-ftcontroller.pdf.

Huynh Tu Dang; "Consensus Protocols Exploiting Network Programmability"; Mar. 2019; 154 pages; available at: https://doc.rero.ch/record/324312/files/2019INFO003.pdf.

Jialin Li; "Co-Designing Distributed Systems with Programmable Network Hardware"; 2019; 205 pages; available at: https://digital.lib.washington.edu/researchworks/bitstream/handle/1773/44770/Li_washington_0250E_20677.pdf?sequence=1&isAllowed=y.

Liu et al.; "Circuit Switching Under the Radar with REACToR"; Apr. 2-4, 2014; 16 pages; USENIX; available at: https://www.usenix.org/system/files/conference/nsdi14/nsdi14-paper-liu_he.pdf.

Ivan Pepelnjak; Introduction to 802.1Qbb (Priority-based Flow Control—PFC); accessed on Jun. 25, 2020; available at: https://gestaltit.com/syndicated/ivan/introduction-802-1qbb-priority-based-flow-control-pfc/.

Juniper Networks Inc.; Configuring Priority-Based Flow Control for an EX Series Switch (CLI Procedure); Sep. 25, 2019; available at: https://www.juniper.net/documentation/en_US/junos/topics/task/configuration/cos-priority-flow-control-cli-ex-series.html.

Cisco White Paper; "Intelligent Buffer Management on Cisco Nexus 9000 Series Switches"; Jun. 6, 2017; 22 pages; available at: https://www.cisco.com/c/en/us/products/collateral/switches/nexus-9000-series-switches/white-paper-c11-738488.html.

Pending U.S. Appl. No. 17/174,681, filed Feb. 12, 2021, entitled "Devices and Methods for Network Message Sequencing", Marjan Radi et al.

Pending U.S. Appl. No. 17/175,449, filed Feb. 12, 2021, entitled "Management of Non-Volatile Memory Express Nodes", Marjan Radi et al.

(56) References Cited

OTHER PUBLICATIONS

Leslie Lamport; "Paxos Made Simple"; Nov. 1, 2001; available at: https://lamport.azurewebsites.net/pubs/paxos-simple.pdf.
Paul Krzyzanowski; "Understanding Paxos"; PK.org; Distributed Systems; Nov. 1, 2018; available at: https://www.cs.rutgers.edu/~pxk/417/notes/paxos.html.
Pending U.S. Appl. No. 16/916,730, filed Jun. 30, 2020, entitled "Devices and Methods for Failure Detection and Recovery for a Distributed Cache", Marjan Radi et al.
Wikipedia; Paxos (computer science); accessed on Jun. 27, 2020; available at: https://en.wikipedia.org/wiki/Paxos_(computer_science).
Written Opinion dated Apr. 27, 2020 from International Application No. PCT/US2019/068269, 3 pages.
International Search Report and Written Opinion dated Jun. 1, 2022 from International Application No. PCT/US2022/017608, 7 pages.
Intel Corporation; "In-Band Network Telemetry Detects Network Performance Issues"; White Paper, Dec. 18, 2020; available at: https://builders.intel.com/docs/networkbuilders/in-band-network-telemetry-detects-network-performance-issues.pdf.
International Search Report and Written Opinion dated Jul. 7, 2022 from International Application No. PCT/US2022/017633, 7 pages.
Sabella et al.; "Using eBPF for network traffic analysis"; available at: Year: 2018; https://www.ntop.org/wp-content/uploads/2018/10/Sabella.pdf.

\* cited by examiner

| Layer | Preamble | Start Of Frame Delimiter | MAC Destination | MAC Source | 802.1Q Tag | Ethertype Or Length | Payload | | | Frame Check Sequence | Interpacket Gap |
|---|---|---|---|---|---|---|---|---|---|---|---|
| Size | 7 Bytes | 1 Byte | 6 Bytes | 6 Bytes | 4 Bytes | 2 Bytes | 4 Bytes | 4 Bytes | 38-1500 Bytes | 4 Bytes | 12 Bytes |
| 2 | | | | | 60 | | 62 | 64 | | | |
| 1 | | | | | | | | | | | |
FIG. 5A
FIG. 5B
FIG. 5C

DEVICES AND METHODS FOR MANAGING NETWORK TRAFFIC FOR A DISTRIBUTED CACHE

CROSS-REFERENCE TO RELATED APPLICATIONS

This application is related to U.S. application Ser. No. 16/548,116 entitled "DISTRIBUTED CACHE WITH IN-NETWORK PREFETCH", filed on Aug. 22, 2019, which is hereby incorporated by reference in its entirety. This application is also related to U.S. application Ser. No. 16/697,019 entitled "FAULT TOLERANT DATA COHERENCE IN LARGE-SCALE DISTRIBUTED CACHE SYSTEMS", filed on Nov. 26, 2019, which is hereby incorporated by reference in its entirety. This application is also related to U.S. application Ser. No. 16/916,730 titled "DEVICES AND METHODS FOR FAILURE DETECTION AND RECOVERY FOR A DISTRIBUTED CACHE", filed on Jun. 30, 2020, which is hereby incorporated by reference in its entirety.

BACKGROUND

Although more recent, high-performance networking may enable distributed caching systems in data centers, challenges remain in sharing network resources among different types of processing nodes and different types of applications with varying traffic demands. For example, certain processing nodes such as Graphics Processing Units (GPUs) may request cache lines from a distributed cache at a rate that is 100 to 10,000 times greater than the cache line request rate of Central Processing Units (CPUs). As a result, such GPUs may monopolize network bandwidth or other network resources, thereby causing cache message loss or significant delay for applications executed by the CPUs. As another example, data intensive, distributed computing applications such as Hadoop or MapReduce may effectively block out less heavy cache demands for scatter-gather applications like web services by, for example, overloading the queues of network switches.

Conventional approaches for resource sharing in a distributed cache are generally not scalable to meet the demands of today's larger and more diverse data centers. Such conventional approaches can include, for example, a static flow scheduling, such as a hash-based flow scheduling, in a tightly time-synchronized environment. Such conventional approaches of network resource sharing are typically not practical for widely varying cache demands caused by different types of processing nodes and different types of applications executed by the processing nodes. For example, heterogeneous processing nodes usually have difficulty remaining synchronized and following an assigned remote memory access schedule for fair network bandwidth allocation. Conventional static flow scheduling is typically based on a maximum data rate of the devices, and the devices often continue to send data despite network bottlenecks and queue overflow at network switches. In addition, conventional hash-based flow scheduling with non-uniform communication can result in hash collisions, which reduce network bandwidth utilization. Accordingly, there is a need for an improved management of network traffic for large-scale distributed caches.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

FIG. 5A depicts an example Ethernet packet format according to one or more embodiments.

FIG. 5B depicts an example 802.1Q tag format in the Ethernet packet format of FIG. 5A according to one or more embodiments.

FIG. 5C depicts an example custom header format in the Ethernet packet format of FIG. 5A according to one or more embodiments.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Distributed Cache Examples

Figure 1:
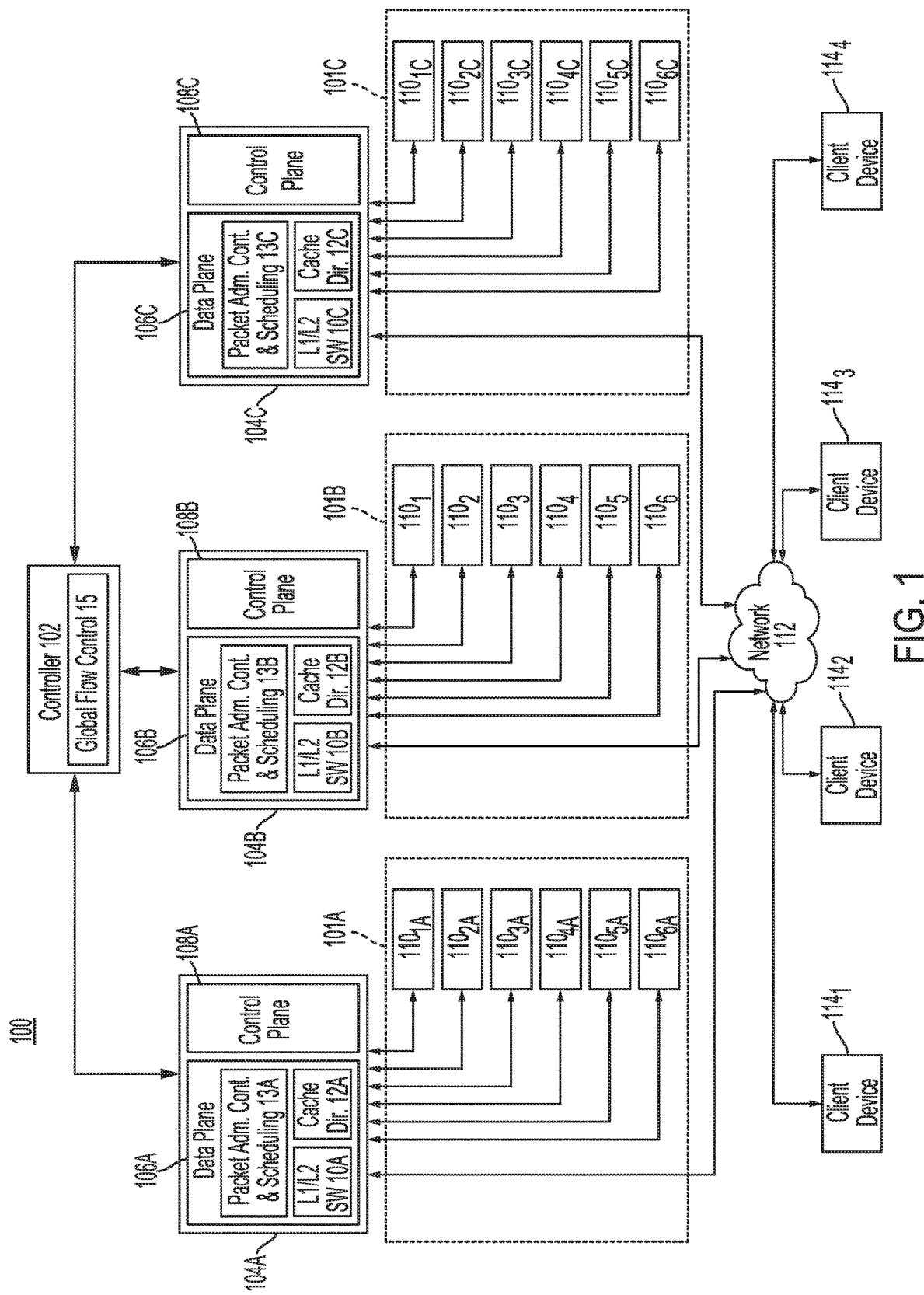
FIG. 1 illustrates a system environment for implementing a distributed cache according to one or more embodiments.

FIG. 1 illustrates an example system environment for implementing a distributed cache according to one or more embodiments. As shown in FIG. 1, client devices $114_1$, $114_2$, $114_3$, and $114_4$, and server racks 101A, 101B, and 101C are connected to network 112 in system 100. Client devices 114 can include, for example, servers or processing nodes on network 112, that share memory devices 110 of server racks 101 for use as an external main memory of the client devices 114. In this regard, data stored in or retrieved from memory devices 110 can include byte-addressable data (i.e., cache lines) to be loaded into a local main memory or processor cache (e.g., L1, L2, or L3 cache) of a client device 114. In some implementations, the system environment of FIG. 1 may be used as part of a data center and/or for distributed processing, such as for distributed machine learning or big data analysis.

Network 112 can include, for example, a Storage Area Network (SAN), a Local Area Network (LAN), and/or a Wide Area Network (WAN), such as the Internet. In this regard, one or more of client devices 114, controller 102, and/or one or more of server racks 101 may not be physically co-located. Server racks 101, controller 102, and client devices 114 may communicate using one or more standards such as, for example, Ethernet, Fibre Channel, and/or Infini-Band.

As shown in the example of FIG. 1, each of server racks 101A, 101B, and 101C is connected to programmable switches 104A, 104B, and 104C, respectively, and includes six memory devices 110. Programmable switches 104A, 104B, and 104C may, for example, serve as Top of Rack (ToR) switches for their respective server racks 101. In other implementations, each server rack 101 may include a backup programmable switch 104 for redundancy.

Controller 102 communicates with each of the programmable switches 104 in system 100. In some implementations, controller 102 can include a Software Defined Networking (SDN) controller. As discussed in more detail below, controller 102 can manage network traffic for system 100 with the use of programmable switches 104 based on information provided to controller 102 from programmable switches 104. In addition, controller 102 in some implementations may also maintain a global cache directory for coherence in the permissions and states of cache lines stored in the distributed cache.

Those of ordinary skill in the art will appreciate that other implementations may include a different number or arrangement of memory devices 110, programmable switches 104, or server racks 101 than shown in the example of FIG. 1. In this regard, system 100 shown in FIG. 1 is for the purposes of illustration, and those of ordinary skill in the art will appreciate that system 100 may include many more memory devices 110, racks 101, client devices 114, and programmable switches 104 than shown in the example of FIG. 1.

Programmable switches 104A, 104B, and 104C route cache messages, such as put requests, get requests, and other communications between client devices 114 and memory devices 110. For example, such cache messages may include a get request for a specific memory address or a permission level request for a client device to modify a cache line requested from a memory device. As discussed in more detail in co-pending application Ser. Nos. 16/697,019 and 16/916,730 incorporated by reference above, such permission levels can be used to maintain the coherency of data across devices in the system.

In some implementations, programmable switches 104 can include, for example, a switch that can be programmed to handle different custom protocols. As discussed in more detail below with reference to FIG. 3, programmable switches 104 can include programmable match-action pipelines to provide a configurable data plane and customized packet processing capability. Examples of such programmable switches can be found in co-pending U.S. application Ser. Nos. 16/548,116, 16/697,019, and 16/916,730, which are incorporated by reference above.

Data planes 106 of programmable switches 104 in the example of FIG. 1 can control point-to-point packet forwarding behavior of the programmable switch, such as with L1/L2 Ethernet packet switching modules 10 and packet admission control and scheduling modules 13. In addition, data planes 106 include local cache directories 12 that can be updated by programmable switches 104 to maintain data coherency of cache lines stored in memory devices 110. Each cache directory 12 can track modifications and storage locations for a given cache line stored in a memory device 110 housed in the server rack 101 corresponding to the programmable switch 104.

Data planes 106 of programmable switches 104 are programmable and separate from higher-level control planes 108 that determine end-to-end routes for packets between devices in system 100. In this regard, control planes 108 may be used for handling different processes, such as the processes in FIGS. 7, 8, 11, and 12 discussed in more detail below.

In one example, programmable switches 104 can be 64 port ToR P4 programmable switches, such as a Barefoot Networks Tofino Application Specific Integrated Circuit (ASIC) with ports configured to provide 40 Gigabit Ethernet (GE) frame rates. Other types of programmable switches that can be used as a programmable switch 104 can include, for example, a Cavium Xpliant programmable switch or a Broadcom Trident 3 programmable switch.

The use of a programmable switch allows for the configuration of high-performance and scalable memory centric architectures by defining customized packet formats and processing behavior, such as those discussed below with reference to FIGS. 5A to 5C. Programmable switches 104 also allow for a protocol-independent switch architecture and the use of off-the-shelf switches, as opposed to specially designed Networks on a Chip (NoCs), for coherence of data across system 100.

Controller 102 using global flow control 15 can provide global traffic flow control by, for example, determining cache message transmission rates for client devices 114 and/or weights for queues used by programmable switches 104 in determining an order for sending cache messages. As discussed in more detail below, each programmable switch 104 can provide controller 102 with cache request information extracted from cache messages received from the programmable switch. The extracted cache request information can include, for example, at least one of a cache message request rate for a client device 114, a number of pending cache requests at a client device 114 or memory device 110, a ratio between cache read requests and cache write requests for a client device 114 or memory device 110, and a capacity to receive cache messages at the client device 114 or memory device 110.

As discussed in more detail below with reference to FIGS. 9 and 10, such cache request information extracted by programmable switch 104 can allow controller 102 to dynamically estimate network traffic load and better determine cache message transmission rates for client devices 114 and/or weights for the queues used by programmable switches 104 in sending cache messages. The relative locations of programmable switches 104 in system 100 between client devices 114, memory devices 110, and controller 102 can ordinarily provide controller 102 with more current network traffic conditions to better estimate network traffic and adjust cache message transmission rates and/or weights for the queues used by programmable switches. Such adjustment of network bandwidth usage and queue control can ordinarily improve the allocation of network resources among diverse types of client devices (e.g., GPUs and CPUs) and among diverse types of applications executed by the client devices (e.g., Hadoop and web services).

In addition, each programmable switch 104 can provide controller 102 with queue occupancy information based on the occupancies of its queues. As used herein, queue occupancy information can indicate, for example, an amount or level of pending cache messages in one or more queues used by the programmable switch 104. In some implementations, the queue occupancy information may indicate an average fullness, such as an average queue occupancy percentage, or availability of the queue to receive messages over a period of time. In other implementations, the queue occupancy information may indicate a number of times the queue reached a predetermined threshold level over a period of time. The adjustment of the weights used by programmable switches 104 can ordinarily help ensure that less data intensive applications do not lose cache messages due to more data intensive applications overflowing the queue.

As noted above, the in-line position of programmable switches 104 can provide a more centralized collection of information and management of network traffic, as compared to conventional network traffic management may occur at the end points of the client device 114 and the memory device 110. This can ordinarily provide for less software overhead at the end points, as compared to the use of Remote Direct Memory Access (RDMA). In addition, the processing resources of programmable switches, such as the use of Content Addressable Memory (CAM) or Ternary CAM (TCAM) tables, or other types of match-action tables, can ordinarily provide faster processing of such traffic information than can occur at the end points of the client device 114 or the memory device 110.

In some implementations, memory devices 110 can include, for example, Storage Class Memories (SCMs) or other types of memory, such as Dynamic Random Access Memory (DRAM) or Static RAM (SRAM), that can store and retrieve data at a byte-addressable size or cache line size, as opposed to a page or block size, as in storage devices such as Solid-State Drives (SSDs) or Hard Disk Drives (HDDs). SCMs can include, for example, Chalcogenide RAM (C-RAM), Phase Change Memory (PCM), Programmable Metallization Cell RAM (PMC-RAM or PMCm), Ovonic Unified Memory (OUM), Resistive RAM (RRAM), Ferroelectric Memory (FeRAM), Magnetoresistive RAM (MRAM), 3D-XPoint memory, and/or other types of solid-state memory. Recently developed SCMs can provide non-volatile storage with a fine granularity of access (i.e., byte-addressable or cache line level) and a shorter data access latency, as compared to storage devices, such as an SSD using conventional flash memory or an HDD using a rotating magnetic disk. However, in some implementations, memories such as flash memory, HDDs, other types of storage may be used by memory devices 110 for the distributed cache.

As will be appreciated by those of ordinary skill in the art with reference to the present disclosure, system 100 may include additional devices or a different number of devices than shown in the example of FIG. 1. For example, some implementations may include a different number of client devices 114, racks 101, switches 104, controllers 102, or memory devices 110.

Figure 2:
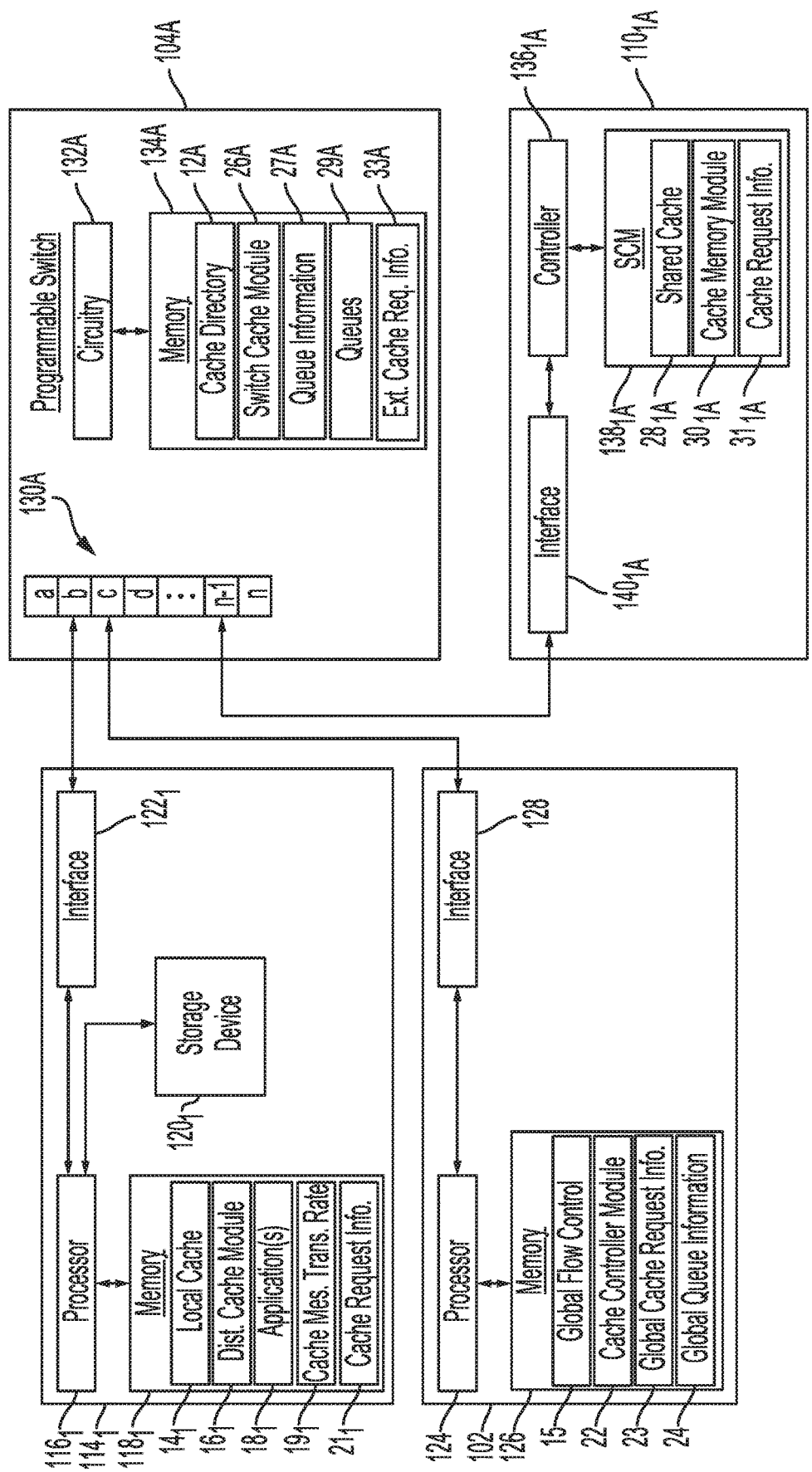
FIG. 2 is a block diagram of example components included in the system environment of FIG. 1 according to one or more embodiments.

FIG. 2 is a block diagram of example components included in system 100 of FIG. 1 according to one or more embodiments. As shown in FIG. 2, client device $114_1$ includes processor $116_1$, memory $118_1$, storage device $120_1$, and interface $122_1$ for communicating on network 112. Although only client device $114_1$ is shown in the example of FIG. 2, clients $114_2$, $114_3$, and $114_4$ from FIG. 1 may have similar or different components as client device $114_1$.

Processor $116_1$ can execute instructions, such as instructions from distributed cache module $16_1$, and application(s) $18_1$, which may include an Operating System (OS) and/or other applications used by client device $114_1$. Processor $116_1$ can include circuitry such as a Central Processing Unit (CPU), a Graphics Processing Unit (GPU), a microcontroller, a Digital Signal Processor (DSP), an Application-Specific Integrated Circuit (ASIC), a Field Programmable Gate Array (FPGA), hard-wired logic, analog circuitry and/or a combination thereof. In some implementations, processor $116_1$ can include a System on a Chip (SoC), which may be combined with one or both of memory $118_1$ and interface $122_1$. Processor $116_1$ can include one or more cache levels (e.g., L1, L2, and/or L3 caches) where data is loaded from or flushed into memory $118_1$, or loaded from or flushed into memory devices 110, such as memory device $110_{1A}$ in FIG. 2, via programmable switch 104A. Such data can include, for example, portions of code and related data being processed by processor $116_1$. The data accessed by processor $116_1$ is referred to herein as cache lines that have a particular cache line size, such as 64 bytes, for example.

Memory $118_1$ can include, for example, a volatile RAM such as SRAM, DRAM, a non-volatile RAM, or other solid-state memory that is used by processor $116_1$ as an internal main memory to store data. Data stored in memory $118_1$ can include data read from storage device $120_1$, data to be stored in storage device $120_1$, instructions loaded from distributed cache module $16_1$ or application(s) $18_1$ for execution by processor $116_1$, and/or data used in executing such applications. In addition to loading data from internal main memory $118_1$, processor $116_1$ also loads data from memory devices 110 as an external main memory or distributed cache. Such data may also be flushed after modification by processor $116_1$ or evicted without modification back into internal main memory $118_1$ or an external main memory device 110 via programmable switch 104A.

As shown in FIG. 2, memory $118_1$ stores distributed cache module $16_1$, which can provide instructions for retrieving, storing, or maintaining coherency of cache lines stored in memory devices 110 in system 100. Such instructions can include setting a cache message transmission rate for sending cache messages from interface $122_1$ and/or collecting cache request information for inclusion in cache messages received by programmable switch 104A. In some implementations, distributed cache module $16_1$ can also implement a protocol for maintaining coherency of data (e.g., cache lines) stored on different devices of system 100 and handling communications with programmable switches 104. In some implementations, distributed cache module $16_1$ can include a driver used by an OS of client device 114A.

Storage device $120_1$ serves as secondary storage that can include, for example, one or more rotating magnetic disks or non-volatile solid-state memory, such as flash memory. While the description herein refers to solid-state memory generally, it is understood that solid-state memory may comprise one or more of various types of memory devices such as flash integrated circuits, NAND memory (e.g., single-level cell (SLC) memory, multi-level cell (MLC) memory (i.e., two or more levels), or any combination thereof), NOR memory, EEPROM, other discrete Non-Volatile Memory (NVM) chips, or any combination thereof. As noted above internal main memory $118_1$ and external memory devices 110 typically provide faster data access and can provide more granular data access (e.g., cache line size or byte-addressable) than storage device $120_1$.

Interface $122_1$ is configured to interface client device $114_1$ with other devices in system 100, such as programmable switch 104A and memory devices 110. Interface $122_1$ may communicate using a standard such as, for example, Ethernet, Fibre Channel, or InfiniBand. In this regard, client device $114_1$, programmable switch 104A, controller 102, and memory device $110_{1A}$ may not be physically co-located and may communicate over a network such as a LAN or a WAN. As will be appreciated by those of ordinary skill in the art, interface $122_1$ can be included as part of processor $116_1$.

Programmable switch 104A in some implementations can be a ToR switch for server rack 101A including memory device $110_{1,4}$. In the example of FIG. 2, programmable switch 104A includes ports 130A, circuitry 132A, and memory 134A. Ports 130A provide a connection to the network and are configured to communicate with devices, such as client devices 114 in FIG. 1, controller 102, and memory devices 110 in server rack 101A. For example, ports 130 may include Ethernet, Fibre Channel, or InfiniBand ports. Circuitry 132A can include circuitry such an ASIC, a microcontroller, a DSP, an FPGA, hard-wired logic, analog circuitry and/or a combination thereof. In some implementations, circuitry 132A can include an SoC, which may be combined with memory 134A.

Memory 134A of programmable switch 104A can include, for example, a volatile RAM such as DRAM, or a non-volatile RAM or other solid-state memory such as register arrays that are used by circuitry 132A to execute instructions loaded from switch cache module 26A or firmware of programmable switch 104A, and/or data used in executing such instructions, such as cache directory 12A, queue information 27A, and extracted cache request information 33A. In this regard, and as discussed in more detail below, switch cache module 26A can include instructions for implementing processes such as those discussed with reference to FIGS. 7, 8, 11, and 12 below to manage network traffic for the distributed cache.

In the example of FIG. 2, memory device $110_{1,4}$ includes SCM $138_{1,4}$ that allows cache lines to be retrieved from and stored in shared cache $28_{1,4}$ for use by client devices 114. Although shared cache $28_{1,4}$ is shown as being stored in an SCM, other implementations may include a different type of memory for storing shared cache $28_{1,4}$. As shown in FIG. 2, SCM $138_{1,4}$ also stores cache memory module $30_{1,4}$, which provides instructions for controller $136_{1,4}$ to implement cache message transmission rates and/or the inclusion of cache request information in cache messages sent to programmable switch 104A.

In addition, cache memory module $30_{1,4}$ may also be used to implement cache coherency processes and a communication protocol for interfacing with programmable switch 104A. Controller $136_{1,4}$ controls operation of memory device $110_{1,4}$, and can include circuitry such as a microcontroller, a DSP, an FPGA, an ASIC, hard-wired logic, analog circuitry and/or a combination thereof. In some implementations, controller $136_{1,4}$ can include an SoC, which may be combined with interface $140_{1,4}$, and/or SCM $138_{1,4}$. Interface $140_{1,4}$ is configured to interface with at least one port of programmable switch 104A, and may interface according to a standard, such as Ethernet, Fibre Channel, or InfiniBand.

Controller 102 in the example of FIG. 2 maintains global cache request information 23 and global queue information 24. As discussed in more detail below with reference to the sequence diagram of FIG. 6, controller 102 receives queue occupancy information and cache request information from programmable switches 104. Controller 102 may execute global flow control 15 to use the collected or aggregated queue occupancy information and/or the cache request information to estimate and manage network traffic for the distributed cache. In some implementations, controller 102 may determine one or more weights for queues used by programmable switches 104 based at least in part on the collected queue occupancy information. As discussed in more detail below with reference to the example of FIG. 4, programmable switches 104 can use such weights to determine an order for sending cache messages from the programmable switch. Controller 102 may periodically, or in response to changes in global cache request information 23 and/or global queue information 24, send one or more assigned weights to one or more of programmable switches 104 to adjust the switch's handling of cache messages.

In addition, controller 102 may use the collected global cache request information 23 and/or global queue information 24 to determine cache message transmission rates to regulate or control the rates at which client devices 114 and/or memory devices 110 send cache messages to programmable switches 104. As discussed in more detail in related application Ser. Nos. 16/697,019 and 16/916,730 incorporated by reference above, controller 102 may also maintain a global cache directory used for ensuring coherence of the data stored in the distributed cache. Controller 102 may periodically, or in response to changes in global cache request information 23 and/or global queue information 24, send one or more cache message transmission rates to one or more client devices 114 and/or memory devices 110 via a programmable switch 104 to adjust the rate at which the devices send cache messages.

Processor 124 of controller 102 executes global flow control 15 to adjust queue weights and cache message transmission rates, as needed. Processor 124 also executes cache controller module 22, which in some embodiments, may be used maintain a global cache directory or perform other processes for maintaining coherency of data in the distributed cache. In some implementations, global flow control 15 may form part of cache controller module 22. As noted above, controller 102 may be considered an SDN controller in some implementations.

Processor 124 can include circuitry such as a CPU, a GPU, a microcontroller, a DSP, an ASIC, an FPGA, hard-wired logic, analog circuitry and/or a combination thereof. In some implementations, processor 124 can include an SoC, which may be combined with one or both of memory 126 and interface 128. Memory 126 can include, for example, a volatile RAM such as DRAM, a non-volatile RAM, or other solid-state memory that is used by processor 124 to store data. Controller 102 communicates with programmable switches 104 via interface 128, which is configured to interface with ports of programmable switches 104, and may interface according to a standard, such as Ethernet, Fibre Channel, or InfiniBand.

As will be appreciated by those of ordinary skill in the art with reference to the present disclosure, other implementations may include a different arrangement or number of components, or modules than shown in the example of FIG. 2. For example, in some implementations, client device $114_1$ may not include storage device $120_1$ or SCM $138_{1,4}$ may be replaced by a DRAM.

Figure 3:
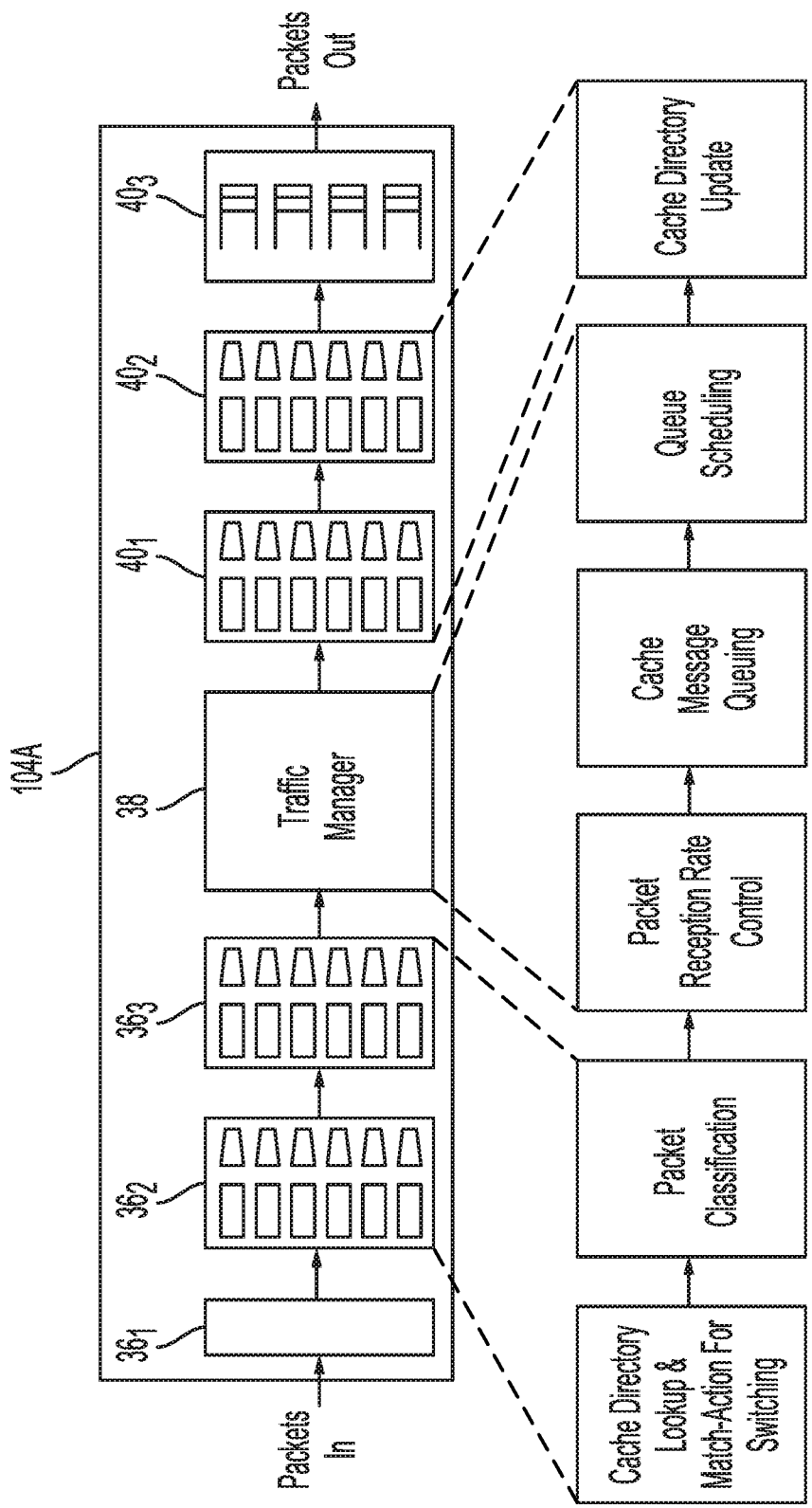
FIG. 3 illustrates example operations performed in a pipeline of a programmable switch according to one or more embodiments.

FIG. 3 depicts example operations performed in a pipeline of programmable switch 104A according to one or more embodiments. As shown in FIG. 3, the pipeline for programmable switch 104A can include parser $36_1$, ingress stages $36_2$ and $36_3$, traffic manager 38, egress stages $40_1$ and $40_2$, and deparser $40_3$. Each of these modules may be programmed, such as by using P4, to handle a custom packet header and protocol, in addition to priority indicators and cache request information included in the packet. The example modules of programmable switch 104A shown in FIG. 3 can be implemented by circuitry 132A and memory 134A in FIG. 2, which is capable of parallel processing of packets in sequential stages.

In the example of FIG. 3 cache messages are received from client device 114 and memory devices 110 as packets by parser module $36_1$ of programmable switch 104A. For its part, parser module $36_1$ is configured to extract packet headers and values from the packet headers, such as a destination address, operation type, source address, priority indicator, or cache request information for match-action operations performed by the ingress and egress stages. The extracted values are fed into the ingress pipeline that includes stages $36_2$ and $36_3$.

As noted above, the extracted cache request information may include information provided by a client device 114 or a memory device 110 to indicate a level of usage of the distributed cache by a client device 114 or a level of usage of a memory device 110 as part of the distributed cache. The cache request information can include, for example, at least one of a cache message request rate for the device, a number of pending cache requests at the device, a ratio between cache read requests and cache write requests for the device, and a capacity to receive cache messages at the device.

The priority indicator extracted by parser module $36_1$ may include an indication of a type of the message or a class of service for the message. For example, parser module $36_1$ may extract a priority indicator of an 802.1Q tag from an Ethernet packet having the format shown in the example of FIG. 5A discussed below. The extracted priority indicator or value may indicate that the packet is a cache message for the distributed cache. Programmable switch 104A may then prioritize the packet for handling in a particular queue that is served more frequently than other queues for the same port 130A based on the extracted priority indicator.

In some cases, different priorities may be used to classify different types of cache messages for handling by different queues of programmable switch 104A. For example, web services applications needing relatively low latency access to the distributed cache may be assigned a first priority indicator by the client device sending the message for a time sensitive Quality of Service (QoS). Programmable switch 104A may then classify or add such packets to a first type of egress queue that serves or sends more packets per round or clock cycle than another type of queue.

As another example, more data intensive applications, such as distributed computing applications (e.g., Hadoop or MapReduce), may be assigned a second priority indicator for a data intensive service class so that programmable switch 104A classifies or adds such packets to a second type of egress queue that serves less packets per round or clock cycle that are part of a larger data flow. In some cases, controller 102 may dynamically adjust the priority indicators used by client devices 114 during operation to help ensure smaller data flows are not blocked by larger data flows.

In another example, certain applications may use a priority indicator for a class of service associated with a greater reliability. In such cases, programmable switch 104A may classify or add such packets to a relatively large egress queue that is less likely to overflow and drop packets. This is in contrast to a traditional First In First Out (FIFO) handling of packets by network switches that does not account for the size of data flows.

As shown in FIG. 3, stages $36_2$ and $36_3$ of the ingress pipeline can perform a cache directory lookup for match-action switching and packet classification. In some implementations, stages $36_2$ and $36_3$ may use CAM or TCAM to quickly identify ports 30A associated with a destination address extracted from the packet by parser $36_1$. Stages $36_2$ and $36_3$ may also classify the packet as a cache message for the distributed cache based on the extracted priority indicator or an indication of the message type in a header of the packet. As noted above, stages $36_2$ and $36_3$ in some implementations may further classify different types or handling of cache messages based on the extracted priority indicator. In some cases, the priority indicator may distinguish between a cache line request message or a data coherency message. In other cases, the priority indicator may distinguish among different expected QoS in terms of latency or reliability, such as in the example provided above for web services applications versus distributed computing applications. The extracted priority indicator can then be used by the ingress stages $36_2$ and $36_3$ to classify the cache message for queuing in a particular egress queue fora port 130A.

As discussed in more detail below with reference to FIGS. 5A to 5C, cache messages can have a custom packet format so that programmable switch 104A can distinguish cache messages, such as messages for cache line addressed data, from other network traffic, such as messages for page addressed data. The indication of a cache message, such as a cache line request to put or get cache line data, causes circuitry 132A of programmable switch 104A to handle the packet differently from other packets that are not indicated as being a cache message. In some implementations, the custom packet format fits into a standard 802.3 Layer 1 frame format, which can allow the packets to operate with existing and forthcoming programmable switches, such as a Barefoot Tofino ASIC switch, for example. In such an implementation, the preamble, start frame delimiter, and interpacket gap may follow the standard 802.3 Layer 1 frame format, but portions in Layer 2 are replaced with custom fields that can be parsed by programmable switch 104A. A payload of a packet for a cache message can include one or more memory addresses for one or more cache lines being requested by a client or being returned to a client, and may include data for the cache line or lines. In addition, the payload of the packet may include additional information, such as cache request information from the device sending the packet.

Stages $36_2$ and $36_3$ can include, for example programmable Arithmetic Logic Units (ALUs) and one or more memories that store match-action tables for matching extracted values from the headers and performing different corresponding actions based on the values, such as performing particular updates to cache directory 12A stored in memory 134A of programmable switch 104A or forwarding extracted cache request information to controller 102. In some implementations, the stages of the ingress pipeline and the egress pipeline may share a single memory, such as memory 134A in FIG. 2. The matches and corresponding actions are made according to predefined rules and the extracted values. As discussed in more detail in related application Ser. No. 16/548,116 incorporated by reference above, the ingress pipeline in some implementations may calculate offsets for additional cache lines to be prefetched based on the parsed header fields, and then generate corresponding additional cache messages for prefetching the additional cache lines using a packet generation engine of programmable switch 104A.

Traffic manager 38 routes the cache line messages to appropriate ports of programmable switch 104A. As shown in FIG. 3, traffic manager 38 implements packet reception rate controls and manages the queues for queuing cache messages for transmission from programmable switch 104A. As discussed in more detail below with reference to the queue occupancy control process of FIG. 11, traffic manager 38 may use a first or soft queue occupancy threshold value for determining when to send a pause frame to at least one client device 114 to temporarily stop the at least one client device 114 from sending additional cache messages. In some implementations, traffic manager 38 may further determine that the queue occupancy has reached an additional or hard threshold value, and send a pause frame to one or more additional client devices 114 to temporarily stop the one or more additional client devices 114 from sending additional cache messages. By using such queue occupancy thresholds, programmable switch 104A can ordinarily prevent a queue from overflowing and resulting packet loss.

In addition, the use of a first queue occupancy threshold value can allow programmable switch 104A to absorb additional cache messages that may be in transit following a lowering of the cache transmission rate of a client device 114 by controller 102. In some implementations, traffic manager 38 of programmable switch 104A may also monitor the packet reception rate for different egress queues, and send a pause frame to a client device 114 that has exceeded its assigned cache message transmission rate from controller 102 or a maximum bandwidth set by programmable switch 104 or controller 102 for the client device 114.

Traffic manager 38 in the example of FIG. 3 also performs queue scheduling for determining the order in which cache messages or packets are sent from ports 130A of programmable switch 104A. In this regard, traffic manager 38 may use weights assigned to different queues for a port that determine a number of packets or cache messages sent from the port in a given round, as in a weighted round-robin scheduling algorithm. As noted above, the weights may be received from controller 102 as part of its network traffic management. Programmable switch 104 may send controller 102 queue occupancy information periodically, or under certain conditions such as when reaching a queue occupancy threshold value. Such queue occupancy information may indicate, for example, an average queue occupancy percentage over a period of time, a number of times a queue occupancy threshold value has been reached, or relative average occupancies of the queues used by a port for sending cache messages.

In the example of FIG. 3, the egress pipeline includes stages 40₁ and 40₂ that can each include ALUs and memories, or portions of memory 134A that can be used for performing additional match-actions for an outgoing cache message. As shown in FIG. 3, egress stages 40₁ and 40₂ also update a local cache directory used by programmable switch 104A for the memory devices 110 in rack 101A. The frames are then assembled in packets by deparser 40₃ for the outbound cache messages before leaving programmable switch 104A by, for example, merging processed headers and a payload.

As will be appreciated by those of ordinary skill in the art, other implementations may include a different arrangement of modules for a programmable switch. For example, other implementations may include more or less stages as part of the ingress or egress pipeline.

Figure 4:
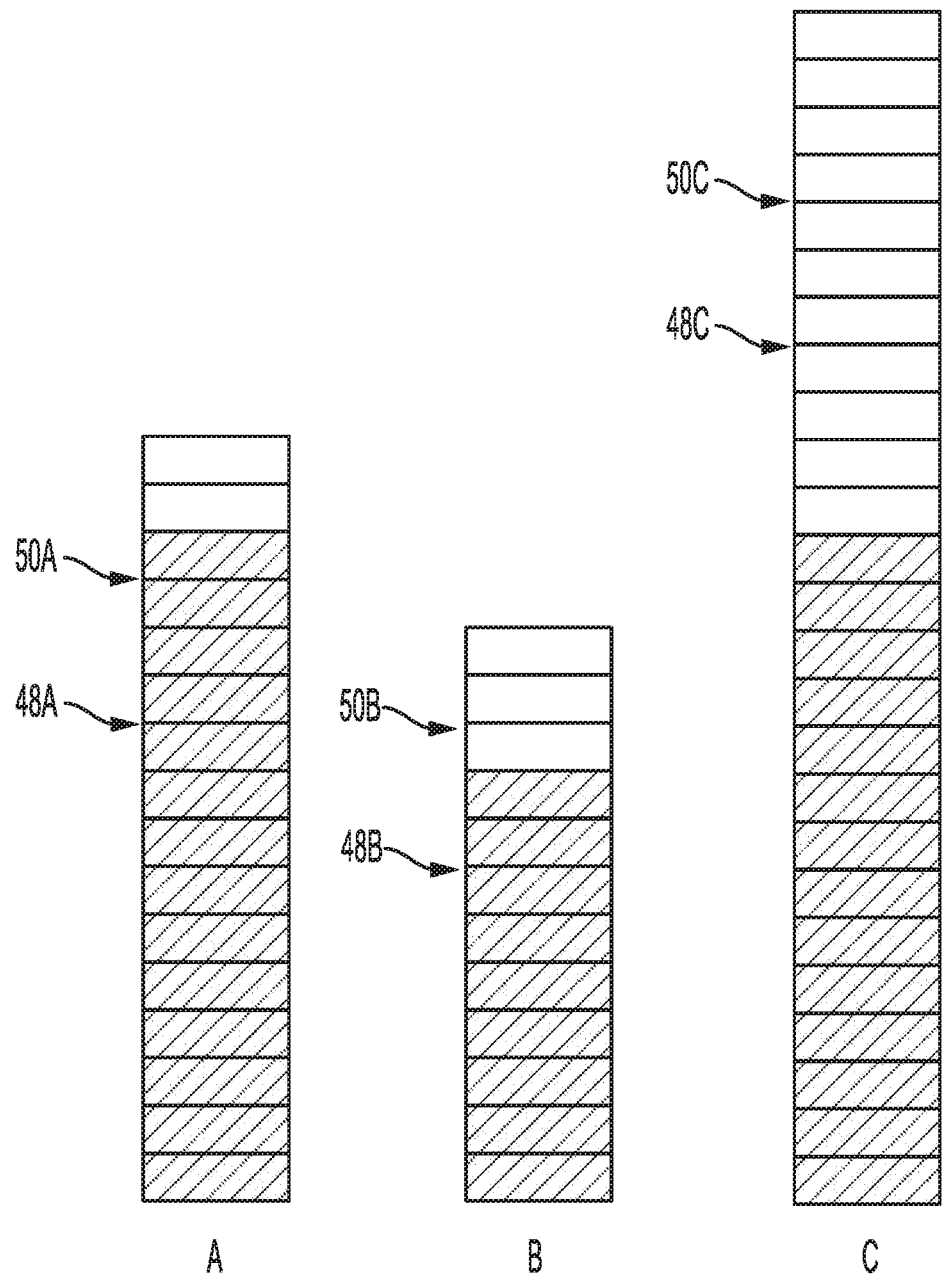
FIG. 4 illustrates an example of queue management according to one or more embodiments.

FIG. 4 illustrates an example of queue management that may be performed by a programmable switch according to one or more embodiments. In the example of FIG. 4, the programmable switch uses three queues A, B, and C to schedule cache messages for transmission from a port of the programmable switch. The number of cache messages that each queue can hold varies. In this regard, each queue may represent a separate buffer stored in a memory of the programmable switch (e.g., queues 29 stored in memory 134A in FIG. 2) with different sizes depending on the size of the corresponding queue. In some implementations, queue B may be used for queuing cache messages that are more time sensitive, while the larger size of queue A may be used for queuing cache messages that have a greater need for reliability. In this regard, the programmable switch may send more cache messages or packets from queue B per round than from queues A and C to prioritize the cache messages queued in queue B. For example, queue B may have a weight of 2, while queues A and C each have weights of 1. This may mean that two cache messages are sent from queue B in each round, while one cache message is sent from each of queues A and C in each round.

In the example of FIG. 4, queue C may be reserved for cache messages identified as part of a message flow that is above a threshold size. As discussed in more detail below with reference to the queue identification process of FIG. 12, message flows greater than a threshold size may be queued in a separate queue, such as queue C in FIG. 4, to prevent smaller sized message flows from being significantly delayed or blocked by the larger message flows. Information included in the cache messages of the message flow may indicate that the cache messages belong to the same message flow, or programmable switch 104 may identify the cache messages as belonging to the same message flow by the receipt of multiple cache messages within a relatively short time frame from the same sending device to be sent to the same destination device. Programmable switch 104 may, for example, keep track of the number of cache messages received from the same sending device that are to be sent to the same destination device within a predetermined window of time to update a message count indicating the size of the message flow.

In addition, each queue has, for example, a first threshold value 48 and a second threshold value 50. The threshold values may, for example, correspond to a number of cache messages pending in the queue, a number of remaining cache messages that can be queued, a percentage of queue fullness, or other indicator of queue occupancy. When the queued cache messages reach the first threshold value 48, programmable switch 104 sends a pause frame to at least one client device 114 to temporarily stop the at least one client device 114 from sending additional cache messages. The packet reception rate control of traffic manager 38 may identify a client device 114 filling the queue that has the greatest packet reception rate or that has exceeded a maximum bandwidth guarantee.

In other implementations, traffic manager 38 may send pause frames to each of the client devices 114 that have cache messages already queued in the queue. Programmable switch 104 may use, for example, an 802.1Qbb pause frame of a Priority-Based Flow Control (PFC) that may have an associated timer for how long the client device 114 should stop sending additional packets to the programmable switch 104, depending on the priority indicator of the packets. When the selection of queues by programmable switch 104 is made based on such priority indicators, programmable switch 104 may use the priority indicators to identify cache messages and client devices 114 filling queues that have reached a threshold value. In addition, the pause time for the different types of data traffic indicated by the priority indicators can correspond to times typically associated with clearing a queue or reducing the queued cache messages below a threshold value (e.g., threshold value 48). The use of different pause times for different priority indicators can facilitate better management of the queues based on the particular types of data flow, types of client devices 114, classes of service, and/or the sizes of the queues.

In this regard, different priority indicators may be associated with different applications via the distributed cache modules 16 executed by client devices 114. As discussed in more detail below with reference to the example packet format of FIGS. 5A to 5C, a value may be used in an 802.1Q tag to indicate a particular class of service that may be assigned to a particular type of client device 114, such as an FPGA, ASIC, CPU, or GPU, and/or that may be assigned to a particular type of application responsible for the cache message, such as a web services application or distributed computing application, for example.

In the example of FIG. 4, when a second threshold 50 is reached for a queue, programmable switch 104 may send one or more additional pause frames to other client devices 114 responsible for filling the queue, or may send pause frames to all client devices 114 responsible for filling the queue to prevent overflow in the queue and the resulting loss of cache messages. In FIG. 4, the second threshold value 50 may still allow for a few additional cache messages to be added to the queue after the additional threshold value 50 has been reached as a further protection against the loss of cache messages that may have been in transit when the pause frame was sent.

In FIG. 4, each of queues A and B have reached the first threshold value 48, leading programmable switch 104 to send at least one pause frame to a client device 114 that has sent cache messages for the queue. Queue A has reached its second threshold value 50A, causing programmable switch 104 to send one or more additional pause frames to one or more additional client devices 114 that have sent cache messages for queue A.

The thresholds values 48 and 50 may initially be set by programmable switch 104 or controller 102 based on considerations such as, for example, a maximum cache message size, a buffer size for temporarily storing data of the queued cache messages, a bit rate of the port associated with the queue, a measured or estimated network latency for transmitting messages between a client device 114 and programmable switch 104, and a cache message processing latency of programmable switch 104. Programmable switch 104 or controller 102 may adjust threshold values 48 and 50 over time based on such considerations and/or the tendency of particular queues to reach one or both of threshold values 48 and 50, or to completely fill up.

Those of ordinary skill in the art will appreciate with reference to the present disclosure that other implementations of queues managed by programmable switch 104 may vary. For example, other implementations may use a different number of queues for a port, queues of all equal size, or only a different number of threshold values for sending pause frames, such as a single threshold value.

FIG. 5A depicts an example Ethernet packet format according to one or more embodiments. As shown in the example of FIG. 5A, the packet format fits into a standard 802.3 Layer 1 frame format, which can allow the packets to operate with existing and forthcoming programmable switches, such as a Barefoot Tofino ASIC switch, for example. The preamble, start frame delimiter, Medium Access Control (MAC) destination and source addresses, and interpacket gap follow the standard 802.3 Layer 1 frame format, but portions of the data payload in Layer 2 are replaced with coherence message fields of custom header 62 and cache request information 64 that can be parsed by programmable switch 104.

The payload of the example frame shown in FIG. 5A can include, for example, one or more cache lines that have been requested from a memory device 110 or one or more modified cache lines that are being flushed back to a memory device 110, in addition to custom header 62 and cache request information 64. In this regard, the payload can include, for example, an address or addresses for one or more cache lines that are requested from a memory device 110 or may include an address or addresses for one or more cache lines being returned to a client device 114 from a memory device 110 via a programmable switch 104. As discussed above with reference to FIG. 3, programmable ingress pipelines of a programmable switch 104 can identify cache line addresses included in the packet and perform match-actions to identify a memory device 110 storing the requested cache lines. In the example of FIG. 5A, the payload also includes a frame check sequence for ensuring the integrity of the data included in the payload. Such error checking may be performed by programmable switch 104, memory device 110, and/or client device 114 to help ensure that the received data is correct.

In some implementations, cache request information 64 may not be present in every cache message packet received by programmable switch. For example, client devices 114 and/or memory devices 110 may only send cache request information 64 at a particular interval, or when a particular condition is reached, such as when a queue of the client device 114 or memory device 110 reaches a threshold.

In some cases, a memory device 110 may include cache request information when a queue for performing write requests or a queue for performing read requests reaches a threshold indicating a delay in performing the write or read requests. If a cache message from the memory device 110 includes cache request information 64 that, for example, indicates a low read to write ratio and a full read request queue, controller 102 after receiving the cache request information may lower a cache message transmission rate for a client device 114 that has been sending cache write requests to the memory device 110 to allow the memory device 110 to perform more cache read requests. As another example, a client device 114 may include cache request information 64 in an outgoing packet when its queue for sending cache messages reaches a high threshold. Controller 102 may then increase the cache message transmission rate for that client device 114 after receiving the cache request information from programmable switch 104.

In other implementations, cache request information 64 may be included in every packet to provide a current view of the state of system 100. Programmable switch 104 may accumulate the cache request information to send to controller 102 in batches or may selectively send the extracted cache request information to controller 102 based on detected packet reception rates and/or queue occupancies. In some implementations, controller 102 may perform network sniffing or otherwise retrieve the cache request information 64 included in the packets.

The Ethernet packet format in the example of FIG. 5A also includes priority indicator 60 as an 802.1Q tag. FIG. 5B depicts an example 802.1Q tag format for priority indicator 60. As shown in FIG. 5B, priority indicator 60 includes a tag protocol identifier, a Priority Code Point (PCP), a Drop Eligible Indicator (DEI), and a Virtual LAN Identifier (VLAN ID). The tag protocol identifier can indicate that that the packet includes an 802.1Q field. The PCP field can indicate the class of service. In the example of 802.1Q, the class of service can have one of eight values, which programmable switch 104 can use to determine a queue for the cache message. In some implementations, a second 802.1Q tag can be included in the packet format for cache messages to double the number of classes of service or priority values to sixteen.

In addition to the PCP field, the example of FIG. 5B also includes a DEI field. The DEI field can indicate whether the packet may be dropped when there is congestion or a traffic bottleneck, such as when a queue at programmable switch 104 becomes full or reaches a high threshold value (e.g., threshold values 48 or 50 in FIG. 4). In such cases, programmable switch 104 may remove cache messages from the queue that indicate that such packets can be dropped based on the DEI for the packet. The example format of FIG. 5B also includes a VLAN ID, which may be used to indicate a virtual LAN to which the packet belongs. In the example of FIG. 1, each client device 114 and memory device 110 may use a particular value indicating membership in the distributed cache. In some implementations, the memory devices 110 of a particular rack 101 may have their own VID that may be a variant of a VID used for system 100 as a whole. The use of the VID, however, may be optional.

As discussed above, the priority indicator can be used by programmable switch 104 to determine a queue for the cache message among a plurality of queues for transmission via a particular port of programmable switch 104. In the example of FIG. 5A, the 802.1Q tag can provide eight different values for different classes of service. Client devices 114 may use these classes of service to associate cache messages from different applications that are responsible for the cache messages. In some implementations, this classification may be performed system wide with controller 102 informing client devices 114 of which applications should have a particular priority indicator value. In this regard, the priority indicators may be adjusted over time through the use of global flow control 15 executed at controller 102, in conjunction with the distributed cache modules 16 and switch cache modules 26 executed at client devices 114 and programmable switches 104, respectively.

Additionally or alternatively, priority indicator 60 can be used to indicate different types of client devices 114. For example, different types of client devices 114 such as FPGAs, CPUs, GPUs, or ASICs may be assigned a value for all of its priority indicators 60 or a range of values depending on the types of applications executed by the client device 114. The use of priority indicators across system 100 for the distributed cache can ordinarily allow for a more diverse or heterogenous use of different client devices 114, and a wider variety of applications that may have different demands on the distributed cache in terms of reliability, the rate of cache messages, and the size of message flows.

FIG. 5C depicts an example custom header format for custom header 62 according to one or more embodiments. As discussed in more detail in related application Ser. Nos. 16/697,019 and 16/916,730, which are incorporated by reference above, the combination of fields in custom header 62 encodes information for coherence operations. A format field in header 62 can indicate a custom header type, such as by including a code indicating an OmniXtend or other custom header type. This format field may also indicate that the packet is for a cache message, as opposed to another type of message, such as to read or write data in units of a block size or page size, as opposed to a cache line size.

The OpCode field can indicate an operation type for an intended operation to be performed using a requested cache line or cache lines, such as an acquire to read or an acquire to read and write. In other cases, the OpCode field can indicate whether the packet is a probe to change the permission level of a client device 114 with respect to a cache line, or a probe acknowledgment to indicate that a permission level has been changed. In this regard, the parameter field of custom header 30 can indicate a current or requested permission level from the device sending the packet.

The size field of header 30 can indicate the size of the data requested (e.g., a number of cache lines or a size in bytes) or the size of the data provided in payload 32. The domain field in FIG. 5C can provide coherence message ordering guarantees within a subset of messages, and the source field can indicate a source identifier or other identifier for the device that issued the request. In this regard, the domain and/or source fields may be used by programmable switch 104 in some implementations to identify a cache message as belonging to a particular message flow.

As will be appreciated by those of ordinary skill in the art in light of the present disclosure, other message or packet formats can be used with programmable switches 104 for cache messages. For example, other implementations may include the priority indicator in the payload, as opposed to a separate 802.1Q tag.

EXAMPLE PROCESSES

Figure 6:
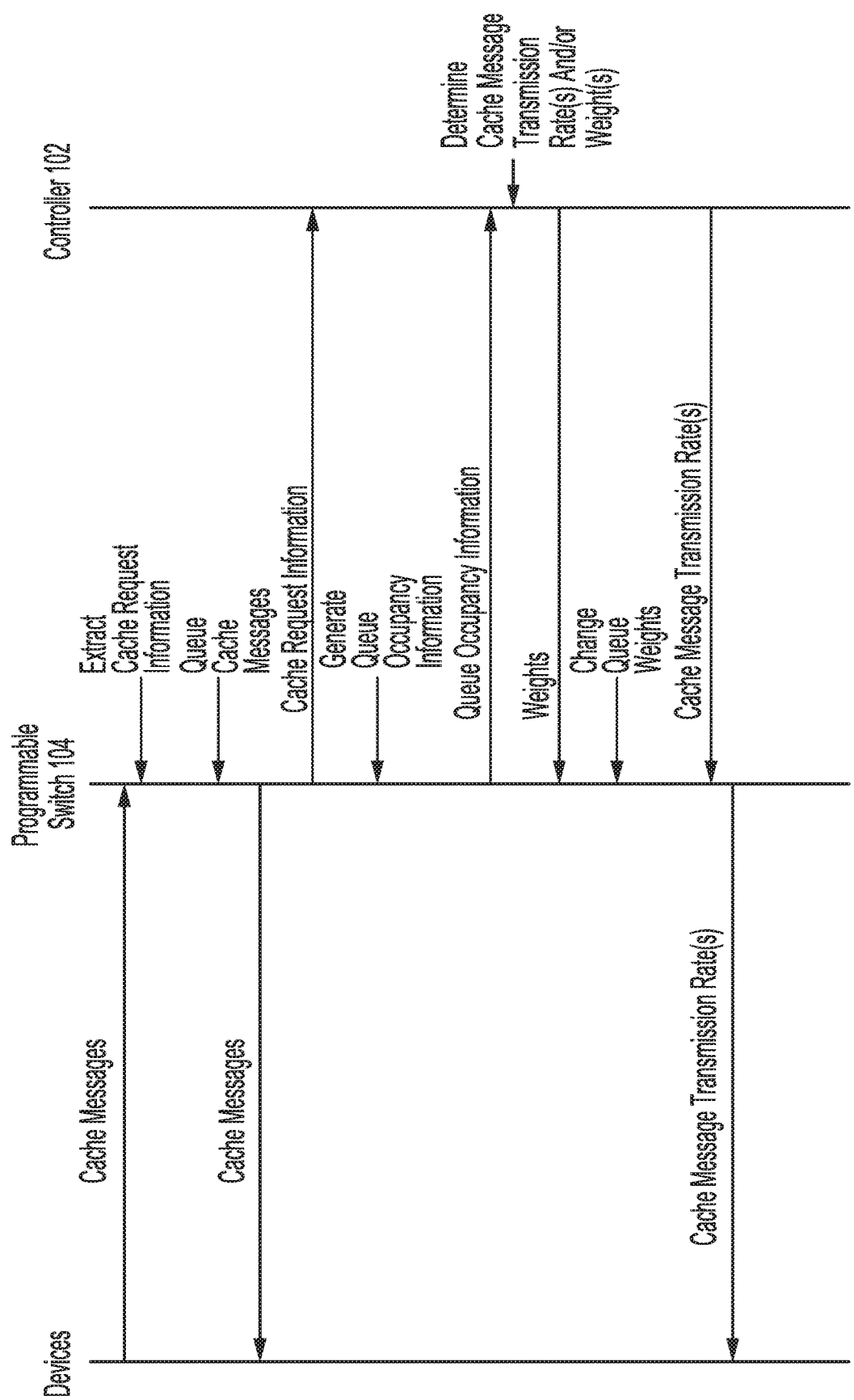
FIG. 6 is an example sequence diagram for cache message management according to one or more embodiments.

FIG. 6 is an example sequence diagram for cache message handling in system 100 according to one or more embodiments. As shown in FIG. 6, cache messages are sent from devices, such as client devices 114 or memory devices 110, to a programmable switch 104. As discussed above, the programmable switch 104 may extract cache request information from the cache message, such as by parsing the cache message and identifying the cache request information in a payload or other field of the cache message.

The cache request information can indicate a usage of the distributed cache, such as by, for example, indicating at least one of a cache message request rate for cache messages sent from a client device 114 or cache messages received by a memory device 110, a number of pending cache requests waiting to be sent from the client device 114 or waiting to be performed by the memory device 110, a ratio between cache read requests and cache write requests sent by the client device 114 or received by the memory device 110, and a capacity to receive cache messages at the client device 114 or at the memory devices, such as an available queue size or queue occupancy for received cache messages.

The received cache messages are queued by the programmable switch 104 in egress queues before being sent out via a port of the programmable switch. In addition to considering the destination address for the cache message, the cache messages may be queued based on information included in the cache message, such as a priority indicator or the size of a current data flow that includes the cache message.

Programmable switch 104 sends the extracted cache request information to controller 102. In some implementations, programmable switch 104 may send all of the extracted cache request information to controller 102 for each cache message, such as by mirroring the extracted cache request information received by programmable switch to one or more ports used to communicate with controller 102. In other implementations, programmable switch 104 may accumulate extracted cache request information until reaching a certain amount of cache request information or until receiving a request from controller 102 for the cache request information. In yet other implementations, controller 102 may perform network sniffing to check on the cache request information stored at programmable switch 104.

In the example of FIG. 6, programmable switch 104 generates queue occupancy information to send to controller 102. As discussed above, the programmable switch 104 can monitor the queue occupancies to provide queue occupancy information to controller 102 for adjusting the weights used for determining an order for servicing the queues. In some cases, the queue occupancy information can indicate an average queue occupancy for the queues used by programmable switch 104 or may indicate how often certain threshold levels of queue occupancy were reached by the queues, such as thresholds values 48 and 50 in the example of FIG. 4 discussed above. Programmable switch 104 may periodically provide queue occupancy information to controller 102, or upon reaching a storage limit for maintaining queue occupancy information. In other implementations, controller 102 may perform network sniffing or otherwise request queue occupancy information from programmable switch 104.

For its part, controller 102 determines at least one of one or more cache message transmission rates for at least one client device 114, and/or determines one or more weights for the queues used by programmable switch 104 in determining an order for sending cache messages. In some implementations, the determination of cache message transmission rates or weights for the queues may be based on one of or both of the received cache request information and queue occupancy information. In this regard, controller 102 may collect or aggregate cache request information and/or queue occupancy information from multiple programmable switches 104 in system 100 to estimate network traffic demand and avoid potential bottlenecks by proactively adjusting cache message transmission rates and/or queue weights during runtime.

Controller 102 sends the determined queue weights to programmable switch 104. In response, programmable switch 104 adjusts the weights used for servicing its queues based on the received weights from controller 102. In some implementations, the weights may indicate a certain number of cache messages serviced from each queue in a given round, as in a weighted round robin scheduling. In other implementations, the weights may indicate an order in which queues are serviced.

Controller 102 also sends the one or more determined cache message transmission rates to programmable switch 104 for forwarding to client devices 114. The cache message transmission rates may be adjusted dynamically as the client devices 114 operate. In this regard, the change to a cache message transmission rate may be temporary to quickly react (e.g., within microseconds) to network congestion and avoid a queue overflow.

Those of ordinary skill in the art will appreciate with reference to the present disclosure that the sequence of operations shown in FIG. 6 may vary in other implementations. For example, the order in which cache request information and queue occupancy information is sent to controller 102 may differ, such that queue occupancy information is sent to controller 102 before the cache request information. In some implementations, the cache request information and the queue occupancy information may be sent together to controller 102, or controller 102 may retrieve or receive one or both of queue occupancy information and cache request information at a different frequency, such as with each cache message received by programmable switch 104. Similarly, the order of determining weights and cache message transmission rates by controller 102, or the order in which controller 102 sends the determined weights and cache message transmission rates to programmable switch 104 may differ from what is shown in FIG. 6.

Figure 7:
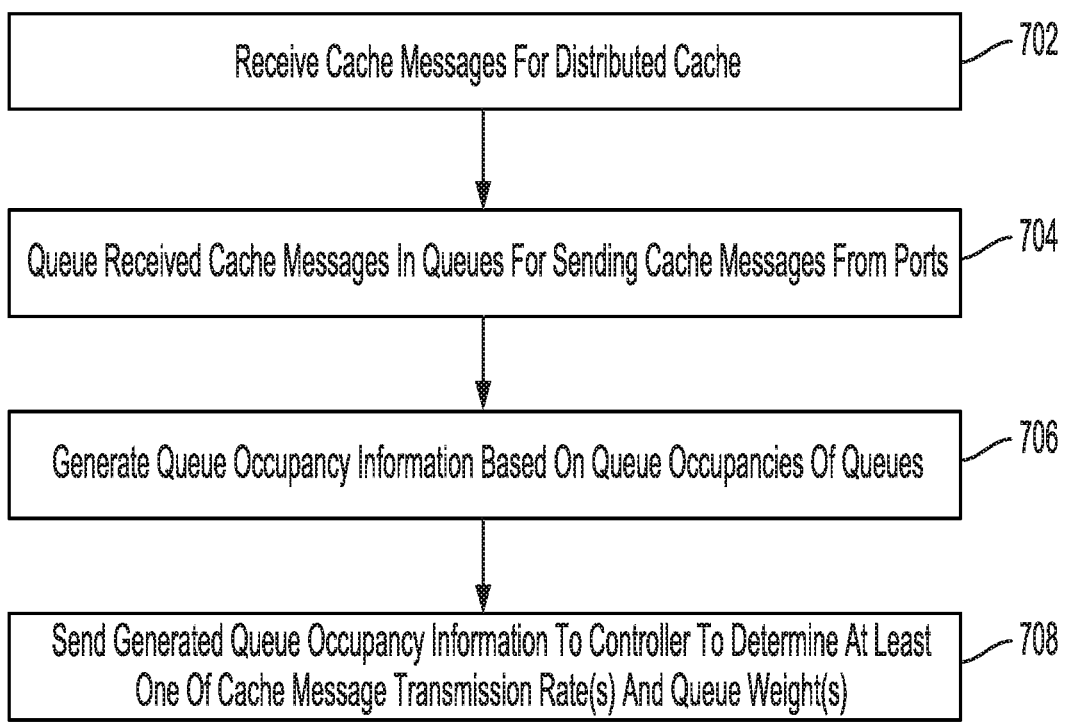
FIG. 7 is a flowchart for a queue occupancy information process according to one or more embodiments.

FIG. 7 is a flowchart for a queue occupancy information process according to one or more embodiments. The process of FIG. 7 can be performed by, for example, circuitry 132 of programmable switch 104 executing switch cache module 26.

In block 702, programmable switch 104 receives cache messages for a distributed cache. As discussed above, programmable switch 104 can identify the cache messages as being for the distributed cache by, for example, parsing a header (e.g., header 62 in FIG. 5A) or a priority indicator (e.g., priority indicator 60 in FIG. 5A) from the cache message. The cache message may be received from a client device 114 or from a memory device 110, and may include one or more cache lines that have been requested by the client device 114 or cache lines that have been modified by the client device 114 for storage in the memory device 110.

In block 704, the received cache messages are queued in queues for sending the cache messages from ports of programmable switch 104. The cache messages may first be routed by match-action stages of the programmable switch to specific ports based on, for example, a MAC address for the destination client device 114 or destination memory device 110.

A priority indicator extracted from the cache message may be used to assign the cache message to a queue that is serviced by the port. As discussed above, the priority indicator may be used to dynamically assign (e.g., during operation of the client device 114) the message flows of a particular application to the same class of service, which can help reduce completion time for the application. In addition, message flows may be dynamically mapped based on the size or an expected size of the message flow. For example, a heavy message flow may be identified by controller 102 via cache request information received from programmable switch 104, and controller 102 may then send the client device 114 responsible for the heavy message flow a lower cache message transmission rate or a new priority indicator for the client device 114. Such dynamic traffic flow control can ordinarily better balance the use of network resources to help prevent smaller message flows or sole cache messages from being blocked by heavier message flows.

In block 706, programmable switch 104 generates queue occupancy information based on its monitoring of the queue occupancies of the queues. The queue occupancy information may indicate, for example, an average queue occupancy over a period of time or may indicate a number of low and high threshold values reached over the period of time. In other implementations, the queue occupancy information can include a relative scoring of the occupancies of the queues.

In block 708, programmable switch 104 sends the generated queue occupancy information to controller 102. The queue occupancy information is used by controller 102, such as by global flow control 15 in FIGS. 1 and 2, to determine at least one of one or more weights for the queues, and one or more cache message transmission rates for at least one client device 114. In some implementations, controller 102 may only determine weights for the queues with the queue occupancy information. In other implementations, controller 102 may instead change the cache transmission rates for at least one client device 114 based on the queue occupancy information. The determined weights and/or cache message transmission rates can then be sent to programmable switch 104 for adjusting the operation of the queues and/or the transmission rates of cache messages. The monitored queue occupancy information from programmable switch 104 can therefore allow system 100 to adjust to varying workloads on the fly to help reduce packet loss and congestion that may occur due to the overflow of queues at programmable switch 104.

Figure 8:
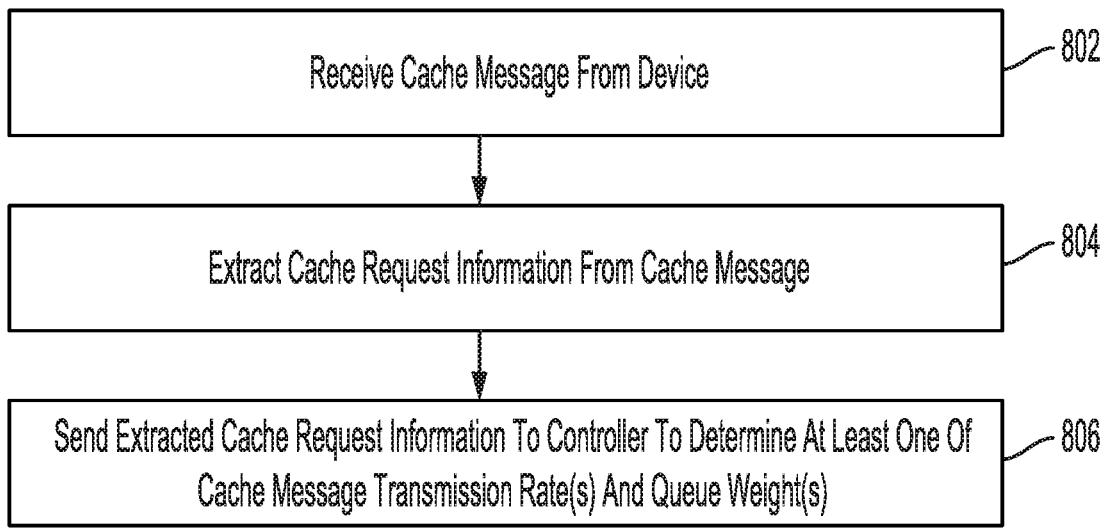
FIG. 8 is a flowchart for a cache request information process according to one or more embodiments.

FIG. 8 is a flowchart for a cache request information process according to one or more embodiments. The process of FIG. 8 can be performed by, for example, circuitry 132 of programmable switch 104 executing switch cache module 26.

In block 802, programmable switch 104 receives a cache message from a client device 114 or from a memory device 110. In this regard, the cache message may be received from a client device 114 to obtain one or more cache lines stored in the distributed cache, or from a memory device 110 to provide a client device 114 with one or more cache lines. In some cases, the cache message may include one or more cache lines that have been modified by the client device 114 for storage at a memory device 110. In yet other cases, the cache message may include a coherency message, such as an acknowledgment of an operation or a request for a permission level to modify one or more cache lines.

In block 804, programmable switch 104 extracts cache request information from the cache message. As discussed above, the cache request information may be extracted by ingress stages of the programmable switch (e.g., stages $36_2$ and $36_3$ in FIG. 3). The cache request information may be extracted from, for example, a payload of the cache message or from another field in the message. The cache request information can indicate a usage of the distributed cache, such as at least one of a cache message request rate for the device, a number of pending cache requests at the device, a ratio between cache read requests and cache write requests for the device, and a capacity to receive cache messages at the device.

In block 806, programmable switch 104 sends the extracted cache request information to controller 102 to determine at least one of one or more cache message transmission rates for client devices 114 and one or more queue weights used by programmable switch 104. The determined weights and/or cache message transmission rates can then be sent to programmable switch 104 for adjusting the operation of the queues and/or the transmission rates of cache messages. As with the queue occupancy information process of FIG. 7, the cache request information process of FIG. 8 can allow system 100 to better adjust to varying workloads on the fly to help reduce packet loss and congestion that may occur due to the overflow of queues at programmable switch 104.

Figure 9:
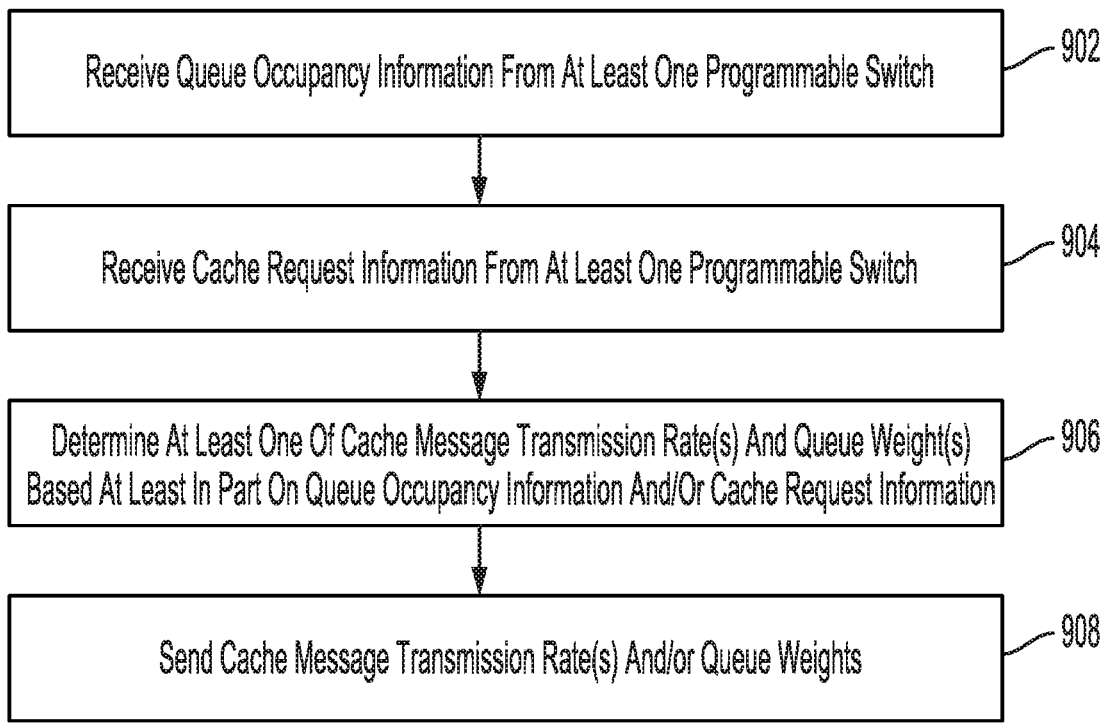
FIG. 9 is a flowchart for a network traffic management process according to one or more embodiments.

FIG. 9 is a flowchart for a network traffic management process according to one or more embodiments. The process of FIG. 9 can be performed by, for example, processor 124 of controller 102 executing global flow control 15.

In block 902, controller 102 receives queue occupancy information from at least one programmable switch 104. In this regard, controller 102 may receive queue occupancy information from multiple programmable switches 104, such as from each of programmable switches 104 in the example of FIG. 1. The queue occupancy information indicates an occupancy of queues used by the programmable switch or switches for sending cache messages. In some implementations, controller 102 may request the queue occupancy information from the programmable switch or switches. In other implementations, the programmable switch or switches 104 may send the queue occupancy information to controller 102 without receiving a request from controller 102, such as on a schedule or upon reaching a particular condition or threshold level in one or more queues.

In block 904, controller 102 receives cache request information from at least one programmable switch 104. In this regard, controller 102 may receive cache request information from multiple programmable switches 104, such as from each programmable switch 104 in the example of FIG. 1. The cache request information indicates a usage of the distributed cache by one or more devices, such as client devices 114 and/or memory devices 110. In some implementations, the cache request information has been extracted from cache messages received by the programmable switch or switches 104. In other implementations, client devices 114 and/or memory devices 110 may send cache request information separately from other cache messages, such that the cache request information forms its own cache message. In addition, controller 102 may request cache request information that may be stored at a programmable switch or switches 104, or programmable switch or switches 104 may send the cache request information to controller 102 without a request from controller 102 based on a schedule or in response to a condition being reached by the programmable switch, such as a threshold level of incoming packets or a threshold queue occupancy.

In block 906, controller 102 determines at least one of one or more cache message transmission rates for one or more client devices 114, and one or more queue weights for one or more programmable switches 104 based at least in part on the received queue occupancy information and/or the received cache request information. As discussed above, the collection of such information by controller 102 during operation of system 100 can ordinarily allow controller 102 to adjust the network traffic for the distributed cache to reduce network traffic congestion and improve the reliability of the distributed cache by avoiding queue overflow. In some cases, this can facilitate the use of Transmission Control Protocol (TCP) in large scale data centers that may provide less synchronization among devices and can have non-uniform or scatter-gather traffic flows.

Those of ordinary skill in the art with reference to the present disclosure will appreciate that the blocks of FIG. 9 may be performed in a different than shown in the example of FIG. 9. For example, other implementations may separately determine queue weights after receiving queue occupancy information in block 902, rather than following the receipt of cache request information in block 904. In this regard, the order of blocks 902 and 904 may be switched in other implementations. In yet other implementations, one of blocks 902 or 904 can be omitted such that the determination in block 906 is only based on received queue occupancy information or received cache request information.

Figure 10:
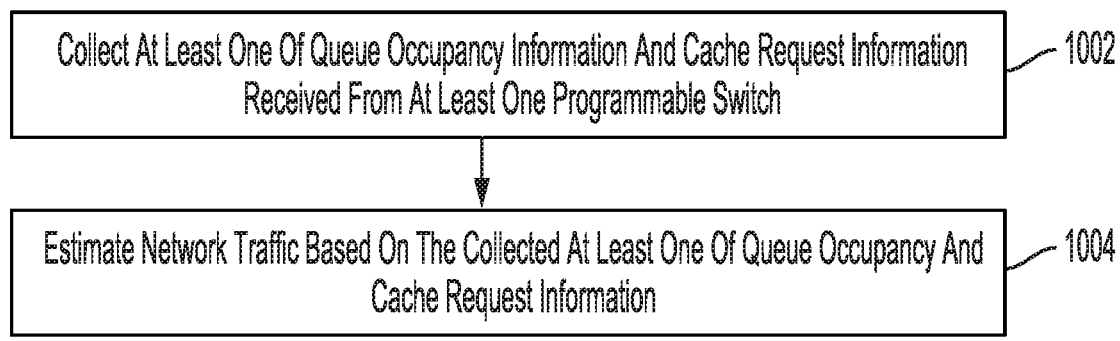
FIG. 10 is a flowchart for a network traffic estimation process according to one or more embodiments

FIG. 10 is a flowchart for a network traffic estimation process according to one or more embodiments. The process of FIG. 9 can be performed by, for example, processor 124 of controller 102 executing global flow control 15.

In block 1002, controller 102 collects or aggregates at least one of queue occupancy information and cache request information that is received from at least one programmable switch 104. The collection or aggregation of queue occupancy information and/or cache request information may be through one or more programmable switches 104 periodically sending the information based on a schedule or in response to certain conditions at the programmable switch, such as a level of incoming cache messages or the level of occupancy of one or more queues used by the programmable switch for sending cache messages. In some cases, controller 102 may alternatively or additionally receive the information from one or more programmable switches through network sniffing to access the information stored at the programmable switch or by mirroring packets received at the programmable switch 104 to controller 102.

The collected or aggregated cache request information may be stored in a data structure in a memory of controller 102, such as in global cache request information 23 in memory 126 in the example of FIG. 2. Similarly, the collected or aggregated queue occupancy information may be stored in a data structure in a memory of the controller 102, such as in global queue occupancy information 24 in memory 126 in the example of FIG. 2.

In block 1004, controller 102 estimates network traffic based on the information collected in block 1002. Controller 102 may collect or aggregate the information for a particular period of time, such as for the previous five minutes or over a period of days, for example. In other implementations, the collection or aggregation of information may be only for the most recent, or a predetermined set of the most recent cache request information and/or queue occupancy information received from each programmable switch 104 in system 100.

In some cases, controller 102 may use both the queue occupancy information and the cache request information received from a programmable switch 104 to estimate network traffic for the programmable switch 104 that sent the information. In addition to adjusting cache message transmission rates and/or queue weights as discussed above, controller 102 may use the estimated network traffic to remap message or data flows in system 100. For example, controller 102 may use a global cache directory stored at controller 102 to identify copies of cache lines stored in different racks 101. Controller 102 may then reconfigure a programmable switch 104 of the higher traffic rack 101 to reroute cache request messages for cache lines to their copies in a lower traffic rack 101, or inform one or more client devices 114 of the address for the memory device 110 in the lower traffic rack 101 that stores the copy.

Figure 11:
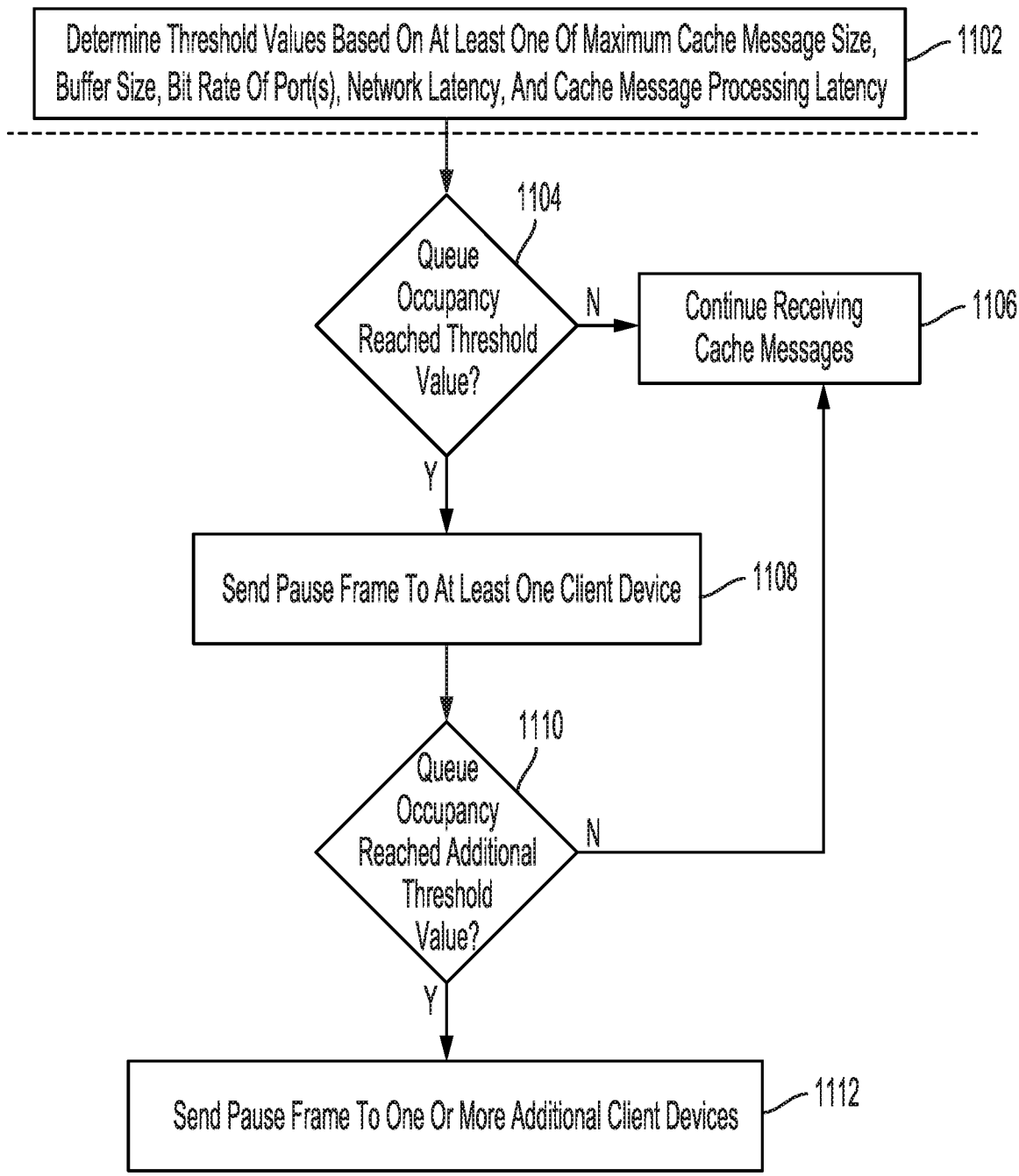
FIG. 11 is a flowchart for a queue occupancy control process according to one or more embodiments.

FIG. 11 is a flowchart for a queue occupancy control process according to one or more embodiments. The process of FIG. 11 can be performed by, for example, circuitry 132 of programmable switch 104 executing switch cache module 26. The process of FIG. 11 may be an ongoing process that is performed for each queue while programmable switch 104 operates.

In block 1102, programmable switch 104 determines threshold values for one or more queues used by the programmable switch for sending cache messages from one or more ports. As indicated by the dashed line following block 1102, the determination of threshold values in block 1102 may be performed at a different time than the performance of blocks 1104 to 1112. The determination of the threshold values can be based on at least one of a maximum cache message size, a buffer size for storing data from queued cache messages, a bit rate for one or more ports of programmable switch 104, a network latency for transmitting messages between at least one client device 114 and programmable switch 104, and a cache message processing latency of programmable switch 104. In some implementations, one or more default values may be set based on some or all of the foregoing factors as part of an initialization process of programmable switch 104. The threshold values may then be adjusted during operation of the programmable switch based on updated values for some or all of the foregoing factors.

In block 1104, programmable switch 104 determines whether a queue occupancy threshold value has been reached. With reference to the example of queues A, B, and C discussed above for FIG. 4, programmable switch 104 may determine whether the occupancy or number of queued cache messages has reached first threshold value 48. If not, the process of FIG. 11 continues to receive cache messages in block 1106.

On the other hand, if it is determined in block 1104 that the first threshold value has been reached, programmable switch 104 in block 1108 sends a pause frame to at least one client device 114 to temporarily stop the at least one client device 114 from sending additional cache messages to programmable switch 104. The pause frame may be sent to a client device 114 that is responsible for filling the queue that has the greatest incoming packet reception rate or that has exceeded a reception rate allocated to the client device 114. In some implementations, the pause frame may include an indication of how long the at least one client device 114 should stop sending additional cache messages, which may be associated with specific priority indicators or the particular queue that has reached the threshold value. In other implementations, all pause frames sent by programmable switch 104 may cause the client device 114 to stop sending additional cache messages for the same amount of time, regardless of the queue or priority indicator. The pause frame may include, for example, an 802.1Qbb pause frame.

In block 1110, programmable switch 104 determines whether the queue occupancy for the queue has reached an additional threshold hold value. With reference to the example of FIG. 4, programmable switch 104 may determine whether the occupancy or number of queued cache messages has reached second threshold value 50. If not, the process of FIG. 11 continues to receive cache messages in block 1106.

On the other hand, if it is determined in block 1110 that the second threshold value has been reached, programmable switch 104 in block 1112 sends a pause frame to one or more additional client devices 114 to temporarily stop the one or more additional client devices 114 from sending additional cache messages to programmable switch 104. The pause frame may be sent to all the remaining client devices 114 responsible for filling the queue, or in some implementations, to the client device 114 or a predetermined number of client devices 114 that currently have the greatest incoming packet reception rate, or that have exceeded a reception rate allocated to the client device or devices 114.

The foregoing queue occupancy control process can ordinarily allow programmable switch 104 to quickly react to prevent the loss of packets or cache messages due to overflow of its queues. The implementation of such network traffic control from the centralized location of programmable switch 104 between client devices 114 and memory devices 110 further allows for a faster and more dynamic control of data flows and congestion than conventional, lossy Ethernet flow control that may be performed by the end nodes (e.g., client devices 114 and memory devices 110). In this regard, the use of programmable switch 104 for such flow control can also free up processing resources at the end nodes, while providing a faster response time.

Those of ordinary skill in the art will appreciate with reference to the present disclosure that other implementations may have a different order of blocks than shown in FIG. 11. For example, other implementations may not include a second or additional threshold value, such that blocks 1110 and 1112 are omitted. As another variation, a queue may fill so quickly that block 1108 is skipped, and pause frames are sent to one or more client devices in block 1112 based on the queue occupancy reaching the second threshold value.

Figure 12:
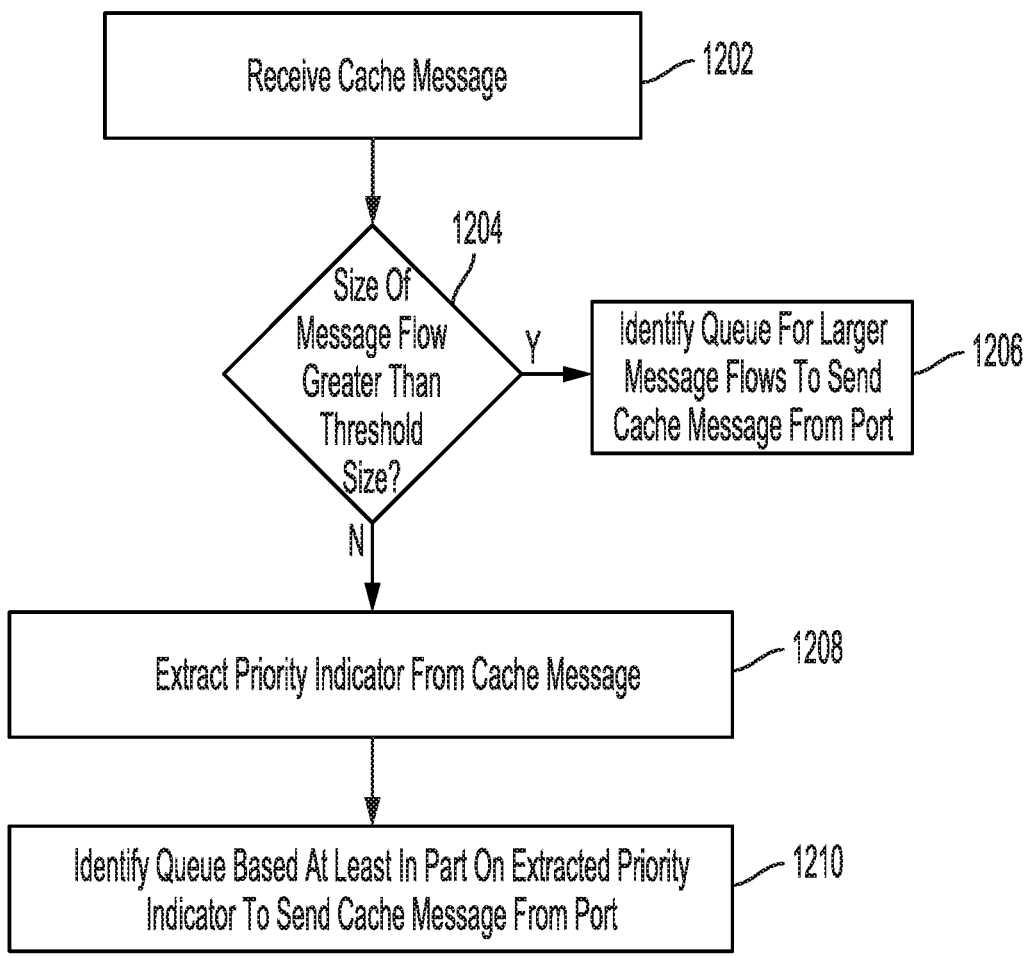
FIG. 12 is a flowchart for a queue identification process according to one or more embodiments.

FIG. 12 is a flowchart for a queue identification process according to one or more embodiments. The process of FIG.

12 can be performed by, for example, circuitry 132 of programmable switch 104 executing switch cache module 26.

In block 1202, programmable switch 104 receives a cache message from a device, such as a client device 114 or a memory device 110. The cache message may indicate a destination address, such as a MAC address for a destination client device 114 or destination memory device 110. Based on the parsed destination address, one or more ingress stages (e.g., ingress stage $36_2$ or $36_3$ in FIG. 3) can route the cache message to a port used by programmable switch 104 for communication with the destination device.

In block 1204, programmable switch 104 determines whether a size of a message flow including the cache message is greater than a threshold size. Information included in cache messages of the message flow may indicate that the cache messages belong to the same message flow, or programmable switch 104 may identify the cache messages as belonging to the same cache flow by the receipt of a predetermined number of cache messages within a predetermined time window from the same sending device to be sent to the same destination device. Programmable switch 104 may keep track of the number of cache messages received from the same sending device that are to be sent to the same destination device within a predetermined window of time to update a message count indicating the size of the message flow.

If it is determined that the cache message received in block 1202 is part of a message flow that is greater than the threshold size, programmable switch 104 in block 1206 identifies a queue that is used for larger message flows from among a plurality of queues for the port. With reference to the example queues of FIG. 4 discussed above, a larger queue or corresponding buffer may be used to queue cache messages for larger message flows. By separately queuing cache messages for message flows greater than the threshold size, it is ordinarily possible to prevent smaller message flows or more isolated cache messages from being blocked by larger message flows.

On the other hand, if the cache message received in block 1202 is not part of a message flow or is part of a message flow that is less than or equal to the threshold size in block 1204, programmable switch 104 in block 1208 extracts a priority indicator from the cache message. In some implementations, the priority indicator may include an 802.1Qbb priority tag that may indicate a class of service for the cache message. Other implementations may include a different type of priority indicator.

In block 1210, programmable switch 104 identifies a queue associated with the value of the priority indicator from among multiple queues used for the port. With reference to the example queues of FIG. 4, cache messages with priority indicators indicating a higher priority or class of service may be queued in a queue such as queue B from which more packets are sent in a given round or clock cycle. Other priority indicators may be used to represent cache messages for applications that may require a higher degree of reliability or lower tolerance for packet loss. The queues associated with such priority indicators may, for example, have a larger size to help reduce the likelihood of an overflow of the queue. The use of different priority indicators for cache messages can allow programmable switch 104 to treat different cache messages differently to better utilize the bandwidth of the network. In addition, and as discussed above, the priority indicators may be adjusted over time to better accommodate changes in traffic patterns, client devices 114, or applications that use the distributed cache.

Those of ordinary skill in the art will appreciate that other implementations of the queue identification process of FIG. 12 may vary. For example, other implementations may omit blocks 1204 and 1206 if the size of message flows is not considered in identifying a queue. As another example variation, blocks 1208 and 1210 may precede blocks 1204 and 1206 in other implementations that may first consider the priority indicator before the size of a message flow for queue identification.

As discussed above, the foregoing use of a centralized programmable switch (e.g., programmable switch 104) and centralized controller (e.g., controller 102) to dynamically monitor and control network traffic for a distributed cache can better manage the non-uniform traffic patterns and variety of client devices found in today's larger data centers. In addition, the use of the programmable switches, controller, and processes discussed above can ordinarily provide faster responses that prevent overflowing a queue and the resulting packet or cache message loss, while not incurring additional computational penalty at the end nodes (e.g., client devices 114 or memory devices 110).

Other Embodiments

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes processor or controller circuitry to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, processor circuitry, and controller circuitry described in connection with the examples disclosed herein may be implemented or performed with a general purpose processor, a GPU, a DSP, an ASIC, an FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. Processor or controller circuitry may also be implemented as a combination of computing devices, e.g., a combination of a DSP and a microprocessor, a plurality of microprocessors, an SoC, one or more microprocessors in conjunction with a DSP core, or any other such configuration.

The activities of a method or process described in connection with the examples disclosed herein may be embodied directly in hardware, in a software module executed by processor or controller circuitry, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to processor or controller circuitry such that the processor or controller circuitry can read information from, and write information to, the storage medium. In the alternative, the storage medium may be integral to processor or controller circuitry. The processor or controller circuitry and the storage medium may reside in an ASIC or an SoC.

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive. In addition, the use of language in the form of "at least one of A and B" in the following claims should be understood to mean "only A, only B, or both A and B."

What is claimed is:

1. A programmable switch, comprising:
a plurality of ports configured for communication with a plurality of devices on a network, wherein the programmable switch is configured to route cache messages between client devices on the network and memory devices on the network; and
circuitry configured to:
receive cache messages for a distributed cache from client devices of the plurality of devices;
queue the received cache messages in queues for sending the cache messages from ports of the plurality of ports to memory devices of the plurality of devices;
determine that a queue occupancy of at least one queue at the programmable switch has reached a high threshold value;
in response to determining that the queue occupancy has reached the high threshold value, send a pause frame to at least one client device to temporarily stop the at least one client device from sending additional cache messages;
generate queue occupancy information based on queue occupancies of the queues; and
send the generated queue occupancy information to a controller on the network, wherein the controller is configured to determine, based at least in part on the queue occupancy information, at least one of:
one or more cache message transmission rates for one or more client devices of the plurality of devices, and
one or more weights for one or more queues used by the programmable switch in determining an order for sending cache messages.

2. The programmable switch of claim 1, wherein the circuitry is further configured to:
receive a cache message from a device of the plurality of devices;
extract cache request information from the received cache message, the cache request information indicating a usage of the distributed cache; and
send the extracted cache request information to the controller, wherein the controller is further configured to determine, based at least in part on the extracted cache request information, at least one of:
the one or more cache message transmission rates for one or more client devices of the plurality of devices, and
the one or more weights for one or more queues used by the programmable switch in determining an order for sending cache messages.

3. The programmable switch of claim 2, wherein the cache request information indicates at least one of a cache message request rate for the device, a number of pending cache requests at the device, a ratio between cache read requests and cache write requests for the device, and a capacity to receive cache messages at the device.

4. The programmable switch of claim 1, wherein the circuitry is further configured to determine the high threshold value based on at least one of a maximum cache message size, a buffer size of the programmable switch for temporarily storing the cache messages, a bit rate of at least one port of the plurality of ports, a network latency for transmitting messages between the at least one client device and the programmable switch, and a cache message processing latency of the circuitry.

5. The programmable switch of claim 1, wherein the circuitry is further configured to:
determine that the queue occupancy has reached an additional high threshold value; and
in response to determining that the queue occupancy has reached the additional high threshold value, send a pause frame to one or more additional client devices to temporarily stop the one or more additional client devices from sending additional cache messages.

6. The programmable switch of claim 1, wherein the circuitry is further configured to:
extract a priority indicator from a cache message received from a client device of the plurality of devices; and
identify, based at least in part on the extracted priority indicator, a queue for queuing the cache message to be sent from a port of the plurality of ports, wherein the port is configured to send cache messages from a plurality of queues associated with different respective priority indicators.

7. The programmable switch of claim 1, wherein the circuitry is further configured to identify, based at least in part on a size of a message flow including the cache message, a queue for queuing the cache message to be sent from a port of the programmable switch, and wherein the port is configured to send cache messages from a plurality of queues.

8. A method of managing network traffic for a distributed cache, the method comprising:
receiving a cache message at a programmable switch on a network from a device on the network, wherein the programmable switch is configured to route cache messages between devices on the network;
extracting a priority indicator from the cache message;
identifying, based at least in part on the extracted priority indicator, a queue for queuing the cache message to be sent from a port of the programmable switch, wherein the port is configured to send cache messages from a plurality of queues associated with different respective priority indicators;
queuing the received cache message in the queue at the programmable switch;
determining, by the programmable switch, that a queue occupancy of the queue has reached a high threshold value; and
in response to determining that the queue occupancy has reached the high threshold value, sending, by the programmable switch, a pause frame to at least one client device to temporarily stop the at least one client device from sending additional cache messages to the programmable switch.

9. The method of claim 8, further comprising:

extracting, by the programmable switch, cache request information from the received cache message, the cache request information indicating a cache usage of the distributed cache; and sending, by the programmable switch, the extracted cache request information to a controller on the network, wherein the controller is configured to determine, based at least in part on the extracted cache request information, at least one of:

one or more cache message transmission rates for one or more client devices using the distributed cache, and one or more weights for one or more queues used by the programmable switch in determining an order for sending cache messages.

10. The method of claim 8, further comprising identifying, based at least in part on a size of a message flow including the cache message, the queue for queuing the cache message to be sent from the port of the programmable switch.

11. The method of claim 8, further comprising:

generating, by the programmable switch, queue occupancy information based on queue occupancies of the plurality of queues; and sending the generated queue occupancy information to a controller, wherein the controller is further configured to determine, based at least in part on the queue occupancy information, at least one of:

one or more cache message transmission rates for one or more client devices using the distributed cache, and one or more weights for one or more queues used by the programmable switch in determining an order for sending cache messages.

12. The method of claim 9 wherein the cache request information indicates at least one of a cache message request rate for the device, a number of pending cache requests at the device, a ratio between cache read requests and cache write requests for the device, and a capacity to receive cache messages at the device.

13. The method of claim 8, further comprising determining the high threshold value based on at least one of a maximum cache message size, a buffer size of the programmable switch for temporarily storing the cache messages, a bit rate of at least one port of the plurality of ports, a network latency for transmitting messages between the at least one client device and the programmable switch, and a cache message processing latency of the programmable switch.

14. The method of claim 8, further comprising:

determining, by the programmable switch, that the queue occupancy has reached an additional high threshold value; and in response to determining that the queue occupancy has reached the additional high threshold value, sending a pause frame to one or more additional client devices to temporarily stop the one or more additional client devices from sending additional cache messages to the programmable switch.

15. A controller for a distributed cache, the controller comprising:

an interface configured to communicate with at least one programmable switch on a network, wherein the at least one programmable switch is configured to route cache messages between client devices on the network and memory devices on the network;

means for receiving cache request information from the at least one programmable switch on the network, wherein the cache request information is extracted from at least one cache message by the at least one programmable switch and the cache request information indicates cache request usage in the distributed cache by providing at least one of a cache message request rate for one or more devices, a number of pending cache requests at the one or more devices, a ratio between cache read requests and cache write requests for the one or more devices, and a capacity to receive cache messages at the one or more devices;

means for determining, based at least in part on the received cache request information, at least one of:

one or more cache message transmission rates for one or more client devices using the distributed cache; and one or more weights for one or more queues used by the at least one programmable switch in determining an order for sending cache messages; and means for sending at least one of:

the one or more cache message transmission rates to the one or more client devices to adjust a rate at which the client device sends cache messages to a programmable switch of the at least one programmable switch; and the one or more weights to the at least one programmable switch.

16. The controller of claim 15, further comprising:

means for receiving queue occupancy information from the at least one programmable switch, the queue occupancy information indicating queue occupancies of queues used by the at least one programmable switch in determining an order for sending cache messages; and means for determining, based at least in part on the received queue occupancy information, at least one of the one or more cache message transmission rates, and the one or more weights.

17. The controller of claim 15, further comprising:

means for collecting at least one of queue occupancy information and cache request information received from the at least one programmable switch, the cache request information indicating cache request usage in the distributed cache; and means for estimating network traffic based on the collected at least one of queue occupancy information and cache request information.

18. The programmable switch of claim 7, wherein the identified queue is configured to queue cache messages from message flows that are greater than a threshold size.

* * * * *